United States Patent [19]
Talluri et al.

[11] Patent Number: 6,014,710
[45] Date of Patent: Jan. 11, 2000

[54] SYSTEM AND METHOD FOR MESSAGE TRANSMISSION BETWEEN NETWORK NODES USING REMOTE WIRES

[75] Inventors: Madhusudhan Talluri, Fremont; Marshall C. Pease, Mountain View, both of Calif.

[73] Assignee: Sun Microsystems, Inc., Mountain View, Calif.

[21] Appl. No.: 08/885,153

[22] Filed: Jun. 30, 1997

[51] Int. Cl.[7] .............................. G06F 13/38; G06F 15/17

[52] U.S. Cl. .......................................... 709/237; 709/219

[58] Field of Search ........................ 395/200.43, 200.46, 395/200.47, 200.49, 286; 371/33; 709/213, 216, 217, 219, 237; 710/106

[56] References Cited

U.S. PATENT DOCUMENTS

| | | | |
|---|---|---|---|
| 4,584,684 | 4/1986 | Nagasawa et al. | 371/33 |
| 4,860,292 | 8/1989 | Newman et al. | 371/32 |
| 4,905,234 | 2/1990 | Childress et al. | 370/94.1 |
| 5,048,771 | 9/1991 | Siering | 244/3.15 |
| 5,163,137 | 11/1992 | Yamamoto et al. | 395/325 |
| 5,289,579 | 2/1994 | Punj | 395/200 |
| 5,572,678 | 11/1996 | Homma et al. | 395/200.12 |
| 5,613,068 | 3/1997 | Gregg et al. | 395/200.13 |
| 5,727,002 | 3/1998 | Miller et al. | 371/32 |
| 5,742,792 | 4/1998 | Yanai et al. | 395/489 |
| 5,742,843 | 4/1998 | Koyamagi et al. | 395/800.14 |
| 5,745,685 | 4/1998 | Kirchner et al. | 395/200.14 |
| 5,751,719 | 5/1998 | Chen et al. | 370/473 |
| 5,781,741 | 7/1998 | Imamura et al. | 395/200.66 |

OTHER PUBLICATIONS

"Microsoft Windows NT Server Cluster Strategy: High Availaibilty and Scalability with Industry–Standard Hardware"; A White Paper from the Business Systems Division of Microsoft; pp. 1–9.

Primary Examiner—Mark H. Rinehart
Attorney, Agent, or Firm—Pennie & Edmonds LLP

[57] ABSTRACT

A first computer sends a sequence of messages to a second computer using remote write operations to directly store each message in a corresponding memory location in the second computer, without performing remote read operations to confirm storage of each message in the second computer's memory. The first computer detects message transmission errors, if any, during the transmission of each message to the second computer and when a message transmission error is detected, resends the message to the second computer. The first computer also sends trigger messages to the second computer to prompt the second computer to process messages stored in the second computer's memory. The second computer processes each received message and uses a remote write operation to store an acknowledgment message in a corresponding memory location in the first computer. The first computer, upon detecting a failure to receive the acknowledgment message corresponding to any of the previously sent messages, undertakes remedial actions to determine whether the second computer has processed each of the unacknowledged previously sent messages. When the remedial actions determine that the second computer has not processed the unacknowledged previously sent message, the first computer prompts the second computer to process the unacknowledged previously sent message. When the remedial actions determine that the second computer has already processed the unacknowledged previously sent message, the first computer stores the acknowledgment message in a corresponding location in the first computer's memory.

13 Claims, 13 Drawing Sheets

SYSTEM AND METHOD FOR MESSAGE TRANSMISSION BETWEEN NETWORK NODES USING REMOTE WIRES

The present invention relates generally to systems and methods for enabling a first computer to transmit messages and data to a second computer, and more particularly to a system and method for making such remote write operations more efficient by avoiding remote read operations normally used for message transmission verification while retaining a high level of message transmission reliability.

BACKGROUND OF THE INVENTION

In many multiple-processor computer systems it is important for processes or tasks running on one computer node (sometimes called the sender) to be able to transmit a message or data to another computer node (sometimes called the receiver). Generally, transmitting messages between computer nodes is expensive in terms of latency and resources used if the successful transmission of each message is verified by performing a remote read operation after each such remote message write operation.

Alternately, instead of using remote reads to verify the successful transmission of each message, in some prior art systems a message is written locally to a local buffer, and then a "cookie" (which is primarily a data structure pointing to the memory location or locations where the message is stored) or other notification message is sent to the receiving system. The receiving system then performs a remote read operation to read the message from the remote memory location indicated in the notification message. In another implementation of this same basic prior art technique, both the message and the cookie are stored locally in the sending system and only a trigger message is transmitted to the receiving system. The receiving system responds to the trigger message by performing a first remote read operation to read the cookie and a second remote read operation to read the message at the location indicated by the cookie.

An advantage of the prior art techniques using remote read operations as an integral part of every message transmission is that remote reads are synchronous, and thus the system performing the remote read is notified immediately if the message transmission fails.

Another advantage of using remote read operations to transmit messages is that remote read operations make it relatively easy to ensure that each message is received and processed by the receiving system once and only once. In most networked computer systems it is essential not to send the receiving system the same message twice. Sending the same message twice could cause the receiving system to perform an operation twice that should only be performed once. Each message must be reliably received and processed by the receiving system exactly once to ensure proper system operation.

Remote write operations are relatively "inexpensive," compared to remote read operations, in terms of system latency and system resources used, because a remote write can be "performed and forgotten."

Referring to FIG. 1, there is shown a highly simplified representation of two prior art computer nodes herein called Node A 50, and Node B 52. The computer at each node can be any type of computer. In other words, the particular brand, architecture and operating system is of no importance to the present discussion, so long as each computer node is configured to operate in a networked environment. Each computer node 50, 52 will typically include a central processing unit (CPU) 54, random access memory 56, an internal memory bus 58 and a communications interface 60, often called a network interface card (NIC). The computer nodes communicate with each other by transmitting messages or packets to each other via a network interconnect 62, which may include one or more types of communication media, switching mechanisms and the like.

Each computer node 50, 52 typically also has a non-volatile, non-random access memory device 64, such as a high speed magnetic disk, and a corresponding disk controller 66.

FIG. 2 shows a simplified representation of a conventional communications interface (or NIC) 60, such the ones used in the computer nodes of FIG. 1, showing only the components of particular interest. The NIC 60 typically includes two address mapping mechanisms: an incoming memory management unit (IMMU) 70 and an outgoing memory management unit (OMMU) 72. The purpose of the two memory management units are to map local physical addresses (PA's) in each computer node to global addresses (GA's) and back. Transport logic 74 in the NIC 60 handles the mechanics of transmitting and receiving message packets, including looking up and converting addresses using the IMMU 70 and OMMU 72.

The dashed lines between the memory bus 60 and the IMMU 70 and OMMU 72 represent CPU derived control signals for storing and deleting address translation entries in the two MMU's, typically under the control of a NIC driver program. The dashed line between the memory bus 60 and the transport logic 74 represents CPU derived control signals for configuring and controlling the transport logic 74.

Memory Mapping between Virtual, Local Physical and Global Address Spaces

Referring to FIGS. 3 and 4, the nodes in a distributed computer system (such as those shown in FIG. 1) utilize a shared global address space GA. Each node maps portions of its local address space into "windows" in the global address space. Furthermore, processes on each of the nodes map portions of their private virtual address space VA into the local physical address space PA, and can furthermore export a portion of the local physical address space PA into a window in the global address space GA. The process of "exporting" a portion of the local physical address space is also sometimes referred to as "exporting a portion of the local physical address to another node," because another computer node is given read and/or write access to the exported portion of the local physical address space via an assigned global address space range.

It should be noted that the local physical addresses (e.g., PA1 and PA2) shown in FIGS. 3 and 4 are physical bus addresses and are not necessarily memory location addresses. In fact, many physical addresses are actually mapped to devices other than memory, such as the network interface. For example, when physical memory on a first computer is exported to a second computer, the physical addresses used in the second computer to write to the exported memory are not mapped to any local memory; rather they are mapped to the second computer's network interface.

When data is written by a process in Node A 50 to a virtual address corresponding to a location in Node B 52, a series of address translations (also called address mapping translations) are performed. The virtual address VA1 from the process in node A is first translated by the TLB (translation lookaside buffer) 80-A in node A's CPU 54-A into a local (physical) I/O address PA1. The local (physical) I/O address PA1 is then translated by the outgoing MMU (OMMU) 72-A in node A's network interface 60-A into a global address GAx. When the data with its global address is received by node B (usually in the form of a message packet), the global address GAx is converted by the incoming MMU (IMMU) 70-B in node B's network interface 60-B into a local physical address PA2 associated with node B. The local physical address PA2 corresponds to a virtual address VA2 associated with a receiving process. A TLB 80-B in node B's CPU 54-B maps the virtual address VA2 to the local address PA2 where the received data is stored.

It should be noted that the term "message transmission" is sometimes used to indicate or imply the use of a message transmission protocol in which the receiving system automatically processes the transmitted message, while the term "data transmission" simply indicates the writing or copying of data from one system to another. However, in this document, the terms message transmission and data transmission will be used interchangeably.

It should be noted here that TLBs generally only translate virtual addresses into local physical addresses, and not the other way around, and thus some of the arrows in FIG. 4 represent mappings rather than actual address translations. When the receiving process in the node B reads a received message at address VA2, the TLB 80-B will translate that virtual address into the same local address PA2 determined by the network interface's IMMU 70-B as the destination address for the received message.

Address space ranges for receiving messages are pre-negotiated between the sending and receiving nodes using higher level protocols that typically use reserved address space, mailbox, or packet based communications that are set up for this purpose. The details of how windows in the global address space are assigned and how receiver side addresses are set up for receiving messages are beyond the scope of this document. Furthermore, the present invention does not require any changes in such communication setup mechanisms.

Receive buffers are allocated in conveniently sized chunks using a corresponding MMU entry. Larger receive buffers, or receive buffers of irregular size, may be constructed using multiple MMU entries by user level protocols. Once the receive buffers are allocated and the corresponding MMU mappings are established, user level programs can read and write to the receive buffers without kernel intervention. Many different kinds of user-level message passing "API's" (application program interfaces) can be built on top of the basic receive buffer mechanism. This includes the send and receive UNIX™ (a trademark of UNIX System Laboratories Inc.) primitives, sockets, ORB (object resource broker) transport, remote procedure calls, and so on. The basic message passing mechanism is designed to be as "light weight" and efficient as possible, so as to take as few processor cycles as possible.

The present invention utilizes the local physical address to global address mapping mechanisms discussed above.

Conventional Remote Write Methodology

FIG. 5 shows the conventional procedure for a process on node A to write a message into a receive buffer at node B. The first step is for Node A to send a request to Node B to set up a receive buffer (also called exporting memory) so that Node A can write a message into it (step 100).

Node B then sets up one or more receive buffers and "exports" the memory allocated to the receive buffer(s) to node A (step 101). In some implementations, this step may be performed in advance, because it is known in advance that Node A will be sending many messages to Node B. In other implementations, the memory exporting step is performed by a procedure in Node B that, before sending a method invocation message or the like to Node A, sets up a receive buffer to receive the results of the method invocation. The memory exporting step 101 is performed by creating an IMMU entry in Node B that maps the physical address range of a receive buffer in Node B's memory to a corresponding range of global addresses and also by setting up a corresponding virtual address to physical address mapping. As indicated above, Node B will typically have a range of global addresses preassigned to it for exporting memory to other nodes. However, other mechanisms for assigning global addresses would be equally applicable.

Next, at step 102, a memory export message is transmitted by Node B to Node A that specifies:

the destination node to which the message is being transmitted;

the source node from which the message is being sent;

the global address corresponding to the receive buffer being exported to Node A; and other parameters, such as protocol parameters, not relevant here.

At Node A, when the memory export message is received, Node A's NIC driver sets up an OMMU entry to import the memory being exported by Node B and also sets up a corresponding virtual address to physical address mapping so that a process in Node A can write data into the receive buffer (step 104). The OMMU entry set up at step 104 maps the global address range specified in the received message to a corresponding range of physical memory in the server node. If necessary (e.g., if insufficient contiguous memory is available and/or the size of the mapped address range is not equal to $2^n$ pages), the server node will generate two or more OMMU entries so as to map the specified global address space to two or more local physical address ranges. The mapped local physical addresses in the first computer are not locations in that computers memory, rather they are otherwise unused addresses that are mapped to the computer's network interface by the OMMU entry or entries.

Once the IMMU in node B and the OMMU in node A have been set up, node A can transmit a message to node B. The dashed line between steps 104 and 106 indicates that no particular assumptions are being made as to the timing relationship between steps 104 and 106 (i.e., one may closely follow the other, or they may be separated both in time and logistically).

Once node A is ready to send a message to node B, the message sending procedure in node A marshals the data to be sent to node B (step 106), which basically means that the data is formatted and stored in a send buffer in a predefined manner suitable for processing by an application procedure in node B.

Then a remote write is performed to copy the contents of the send buffer to the assigned global addresses (step 108). Writing data to a global address causes the sending node's communication interface to transmit the data being written to the node associated with those global addresses, as indicated in the sending node's OMMU entry (or entries) for those global addresses. This data transmission operation (step 108) may be performed under direct CPU control by "programmed I/O" instructions, or it may be performed by a communications interface (NIC) DMA operation (i.e., in which case the DMA logic in the communication interface handles the transfer of data from local physical memory to the communications network).

Some communication networks and interfaces utilize what is known as an RMO (relaxed memory order) memory model, and can reorder messages so as the optimize the use of available resources. Also, many communication systems do not guarantee delivery of all messages handed off to them. Thus, there is no assurance that, once a message is sent, that it will actually be transmitted to the specified destination node, nor that it will be written into the receive buffer corresponding to the global addresses specified in the message. As a result, prior art computer systems are often designed to verify the transmission of each message before allowing any succeeding tasks to be performed. Such verification is typically achieved by performing a remote read (see step 110) so as to read at least a portion of the contents of the receive buffer in Node B, to determine whether or not the message was in fact written into the receive buffer.

Remote read operations are very expensive in terms of system latency, and communication system usage, because the thread in the sending system performing the remote read must wait for a request to be sent to the other node and for the response to be sent back before the thread can resume further processing. The resulting delay includes transmission time to and from the receiving system, access time on the remote system for accessing and invoking the procedure (s) needed to process the read request. Thus, remote reads tend to seriously degrade the performance of both the system performing the remote read and the communication system.

Remote write operations, on the other hand, are relatively inexpensive because the thread in the sending system performing the remote write simply delivers to its communication interface the data to be remotely written, and then proceeds with the next instruction in its instruction stream.

As indicated, after performing the remote write in step 108, the typical message transmission procedure will perform a remote read to verify transmission of the message to the receive buffer in Node B. If the remote read operation determines that the message was not successfully stored in the receive buffer, the remote write step (108) is repeated.

Once the remote write step 108 successfully completes, another remote write operation is performed (step 112) to store a short message in a "received message queue" in Node B. The short message typically contains a "cookie" or other data structure that indicates the location of the main message transmitted at step 108. Alternately, if the entire message being sent is very short (e.g., less than 60 bytes), steps 108 and 110 may be skipped, and the entire message transmitted may be stored in the receive queue by step 112.

Once again a remote read is performed (step 114) to confirm the successful writing of the short message, and the remote write is repeated, if necessary, until the short message is successfully stored in Node B's receive queue.

Finally, a trigger message is sent to Node B's network interface (step 116), which triggers the execution of a procedure in Node B for processing received messages (e.g., by inspecting the received message queue to determine what new messages have been received, and so on).

At some point after the message has been sent and processed, the message sending thread in node A unexports the receive buffer it has used by tearing down or modifying the OMMU entry for the previously imported memory (step 118).

Node B, responds to either the receipt of the short message and/or the trigger message by processing the received short message and then the main data portion of a received long message, if any (step 120). In addition, or as part of step 120, Node B will also modify or tear down the IMMU entry for the receive buffer (step 122) so as unexport the receive buffer and enable write access to the receive buffer by a message processing application program.

As indicated above, there is an alternate message sending technique in which a message is written locally to a local buffer, a "cookie" or other notification message is sent to the receiving system, and the receiving system then performs a remote read operation to read the message from the remote memory location indicated in the notification message. This message transmission technique has the same basic problems, due to the use of remote read operations, as the message sending technique described with respect to FIG. 5.

Of course, the prior art includes many variations on the sequence of operations described above with reference to FIG. 5 for performing remote write operations. However, the steps described are typical for distributed computer system using UNIX™ (a trademark of UNIX System Laboratories, Inc.) type operating systems, such as Solaris™ (a trademark of Sun Microsystems, Inc.).

SUMMARY OF THE INVENTION

The present invention is a system and method for performing remote write operations, and for sending messages from one node to another in a distributed computer system. The distributed computer system typically has multiple computers or computer nodes, some of which may be part of a cluster of computer nodes that operate as a single server node from the viewpoint of computers outside the server cluster.

A second computer exports to a first computer the memory associated with a set of receive buffers by generating and storing one or more incoming MMU (IMMU) entries that map the read buffer to an assigned global address range. The assigned global address range is communicated to the first node in a memory export message.

At the first computer, the memory export message is serviced by performing a memory import operation, in which one or more outgoing MMU (OMMU) entries are generated and stored for mapping the global address range specified in the memory export message to a corresponding range of local physical addresses. The mapped local physical addresses in the first computer are not locations in that computer's memory.

The first computer sends a sequence of messages to the second computer using remote write operations to directly store each message in a corresponding memory location (i.e., receive buffer) in the second computer, without performing remote read operations to confirm storage of each message in the second computer's memory. The first computer detects transmission errors, if any, during the transmission of data to the second computer and when a transmission error is detected, resends the message to the second computer. The first computer also sends trigger messages to the second computer to prompt the second computer to process messages stored in the second computer's memory.

The second computer processes each received message and uses a remote write operation to store an acknowledgment message in a corresponding memory location (in an ack message queue entry) in the first computer.

The first computer, upon detecting a failure to receive the acknowledgment message corresponding to any of the previously sent messages, undertakes remedial actions to determine whether the second computer has processed each of the unacknowledged previously sent messages. When the remedial actions determine that the second computer has not processed the unacknowledged previously sent message, the first computer prompts the second computer to process the unacknowledged previously sent message. When the remedial actions determine that the second computer has already processed the unacknowledged previously sent message, the first computer stores the acknowledgment message in the corresponding ack message queue entry.

A feature of the present invention is that it can positively determine whether a message transmission failure was caused by a failure while transmitting the message data to the receiving system, or while the receiving system was transmitting an acknowledgment message back to the sending system. Reliably making this determination is important and not easily accomplished in a system that uses remote read operations only for analyzing message transmission errors, but not for detecting the occurrence of message transmission errors. Accurately making such determinations is critical because it is important not to send the receiving system the same message twice. Sending the same message twice could cause the receiving system to perform an operation twice that should only be performed once. Each message must be reliably received and processed by the receiving system exactly once to ensure proper system operation.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The present invention is directed at a method of making fully reliable message transmission operations more efficient, especially in an environment in which it is known that remote write operations are highly (but not fully) reliable. One such environment is the server cluster environment shown in FIG. 6.

Server Cluster

Figure 6:
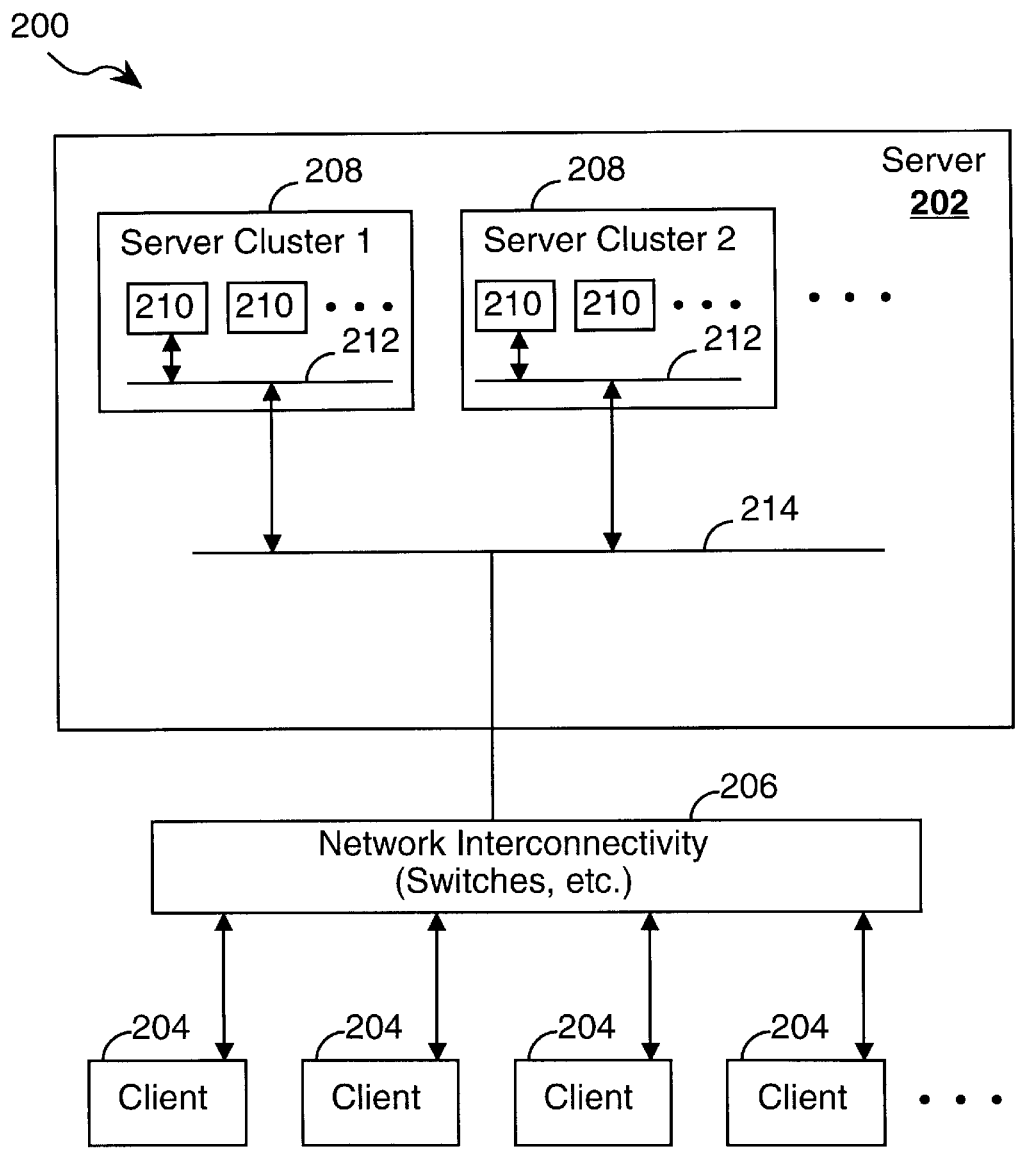
FIG. 6 depicts a computer system having a cluster of computers operating as a single server node.

Referring to FIG. 6, there is shown a distributed computer system 200 that includes a multi-CPU server 202 and numerous client computers 204 that are coupled to the server via one or more communication networks 206. The server 202 includes one or more a clusters 208 of computers 210 so as to provide more computational services to the clients 204 than could be provided by a single server computer. The server 202 is sometimes referred to as "the server cluster." For the purposes of the present document, it is irrelevant whether two server computers 210 that need to share information are in the same or different clusters 210. Computational and file serving tasks are distributed over the server's computers 210.

As a result, the data needed by a process running on one server computer may be located in another server computer. Message communications between nodes within the server cluster 202 are fast and highly reliable, with error or failure rates typically less than one per million messages.

For the purposes of describing the present invention, the terms "sender" (or sending node) and "receiver" (or receiving node) will both be used to refer to computers 210 within the server 202. However, the present invention could also be used to perform remote writes between any "true" client computer 204 and a server computer 210 in the server cluster 202, so long as remote writes of data between the two computers is known to be highly reliable.

When message transmission failures occur at extremely low rates, such as less than once per million messages (having an average length of less than 4096 bytes), the use of remote read operations to verify the successful transmission of each message is costly. However, in order to provide reliable inter-node message communications, even highly occasional message transmission errors or failures must be automatically detected and corrected. The present invention provides a mechanism that avoids the need for performing remote read operations except (A) when performing synchronous remote write operations, and (B) to recover from apparent or real message transmission failures.

Overview of Reliable Message Sending Procedure

Figure 1:
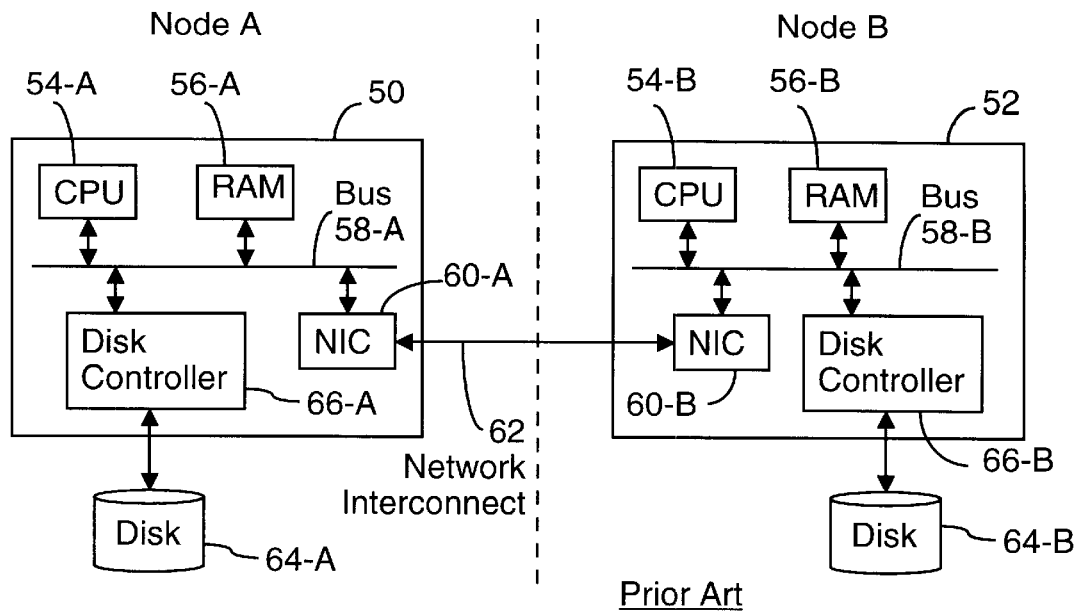
FIG. 1 is a block diagram of two computer nodes in a computer network.
Figure 2:
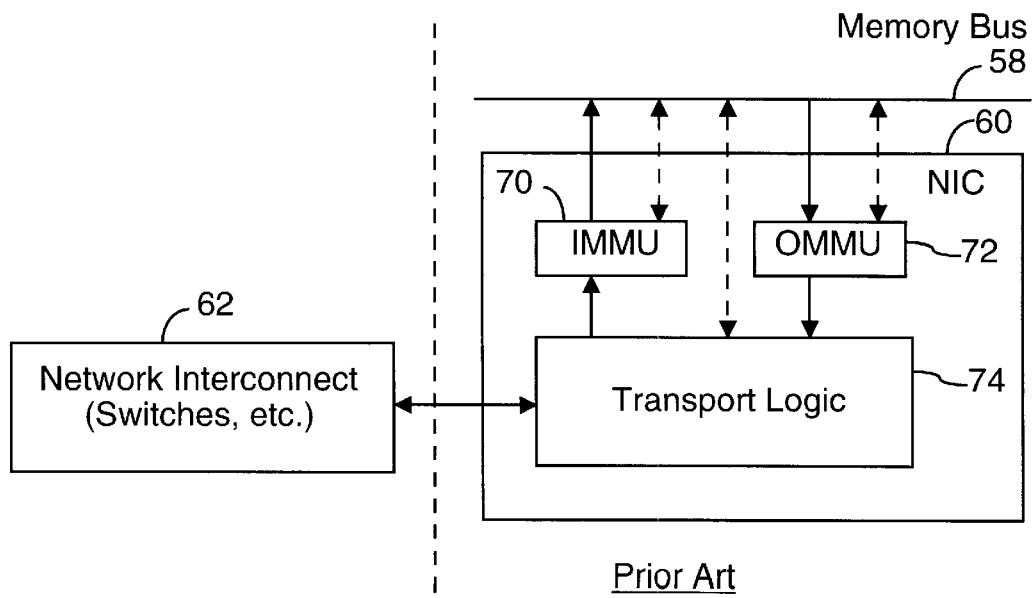
FIG. 2 is a block diagram depicting the components of the communications interface found in each computer of a computer network, such as the one shown in FIG. 1.
Figure 3:
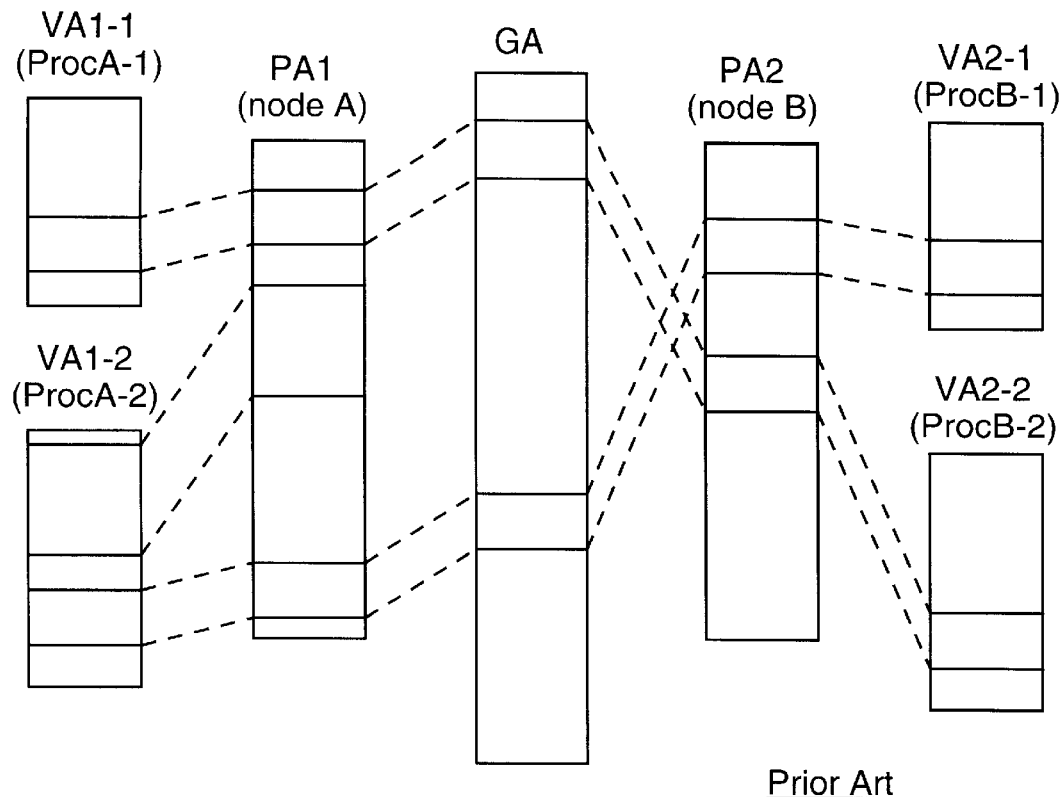
FIG. 3 depicts virtual, local and global address spaces and mappings between those address spaces.
Figure 4:
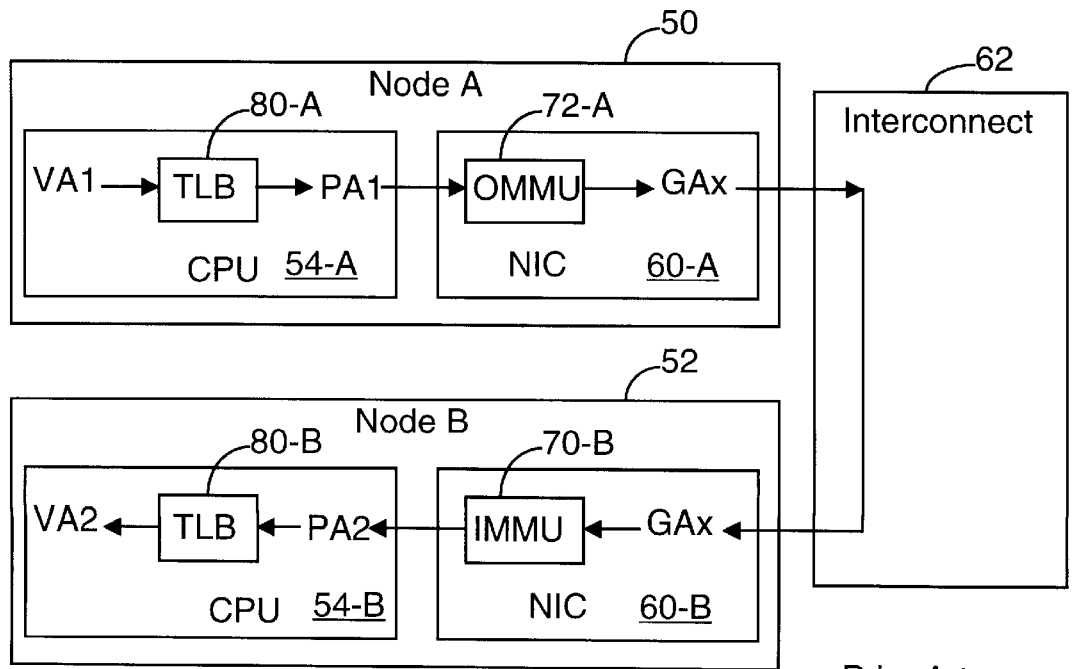
FIG. 4 is a block diagram of the computer modules used to perform address translations associated with transmitting data from a first node to a second node of a distributed computer system.
Figure 5:
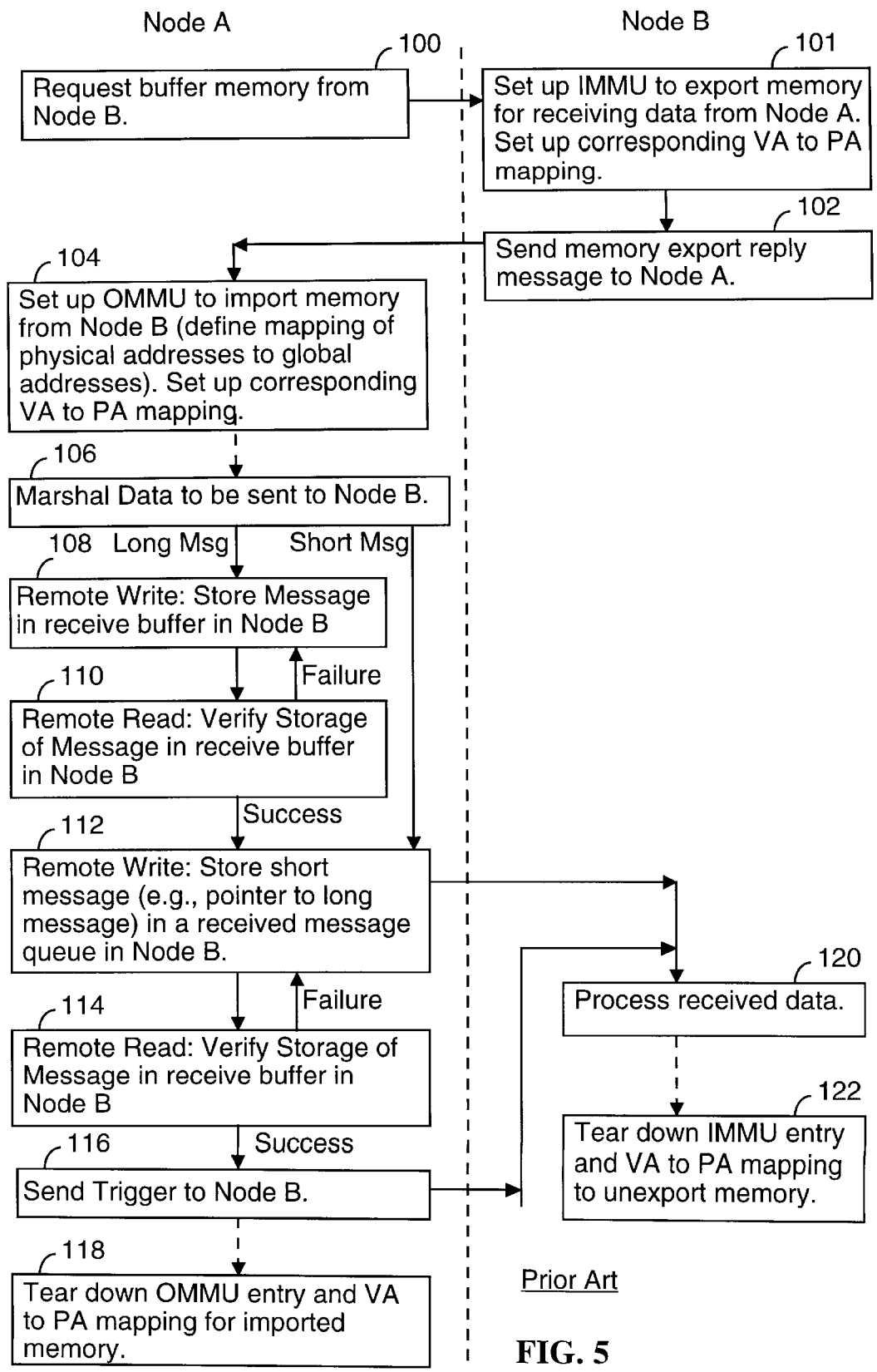
FIG. 5 is a flow chart of a conventional remote write procedure.
Figure 7:
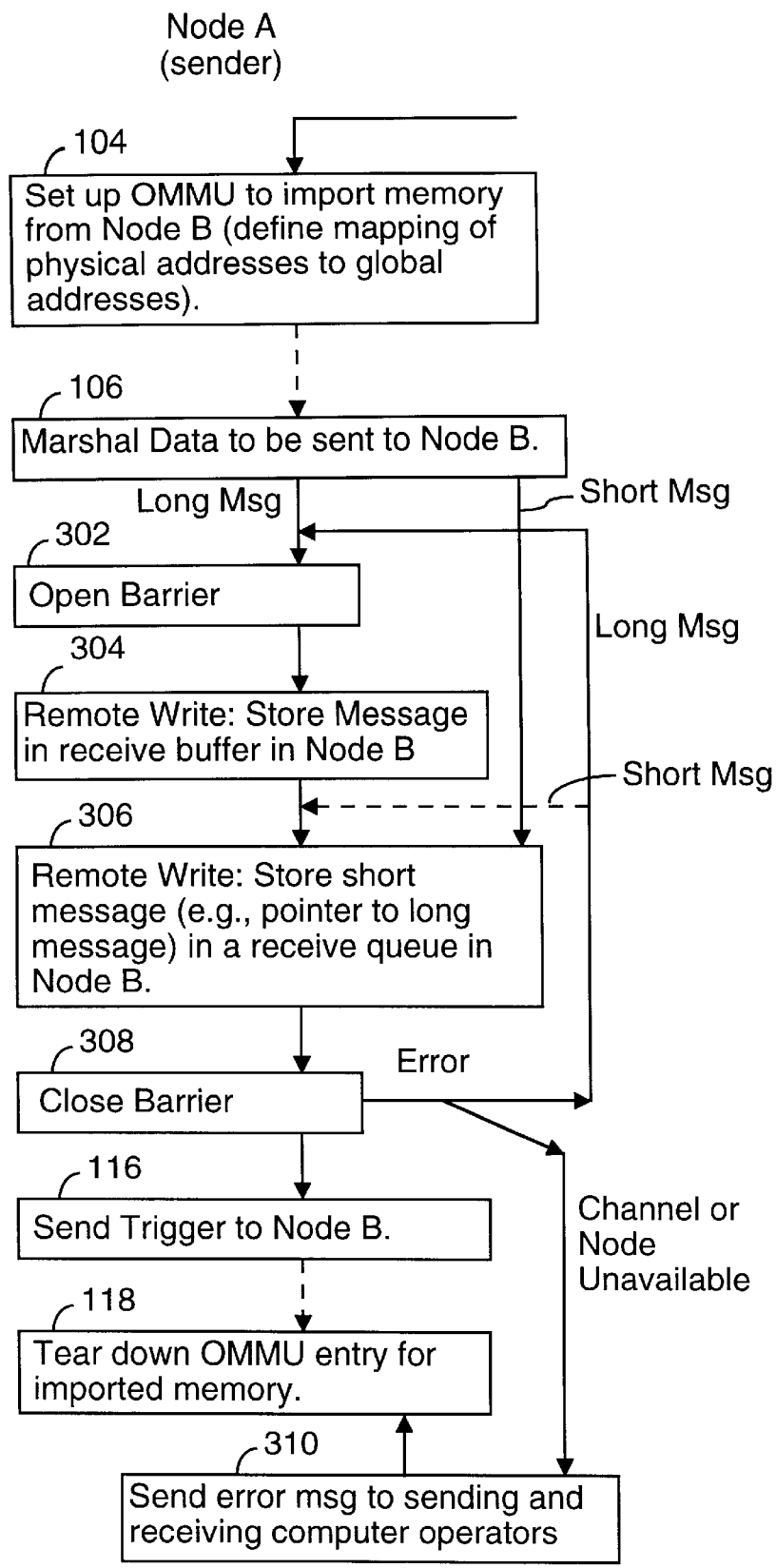
FIG. 7 is a flow chart of a reliable message sending procedure in accordance with one embodiment of the present invention.

FIG. 7 shows a highly simplified representation of the improved message sending procedure of the present invention. Since the steps performed by the receiving node are the same as those shown in FIG. 5, only the steps performed by the sending node are shown. Some of the steps of this procedure are the same as those described above with respect to FIG. 5, and therefore assigned the same the reference numbers as in FIG. 5. New or modified steps are assigned new reference numbers.

The first step is for the sending node, when a memory export message is received, to set up an OMMU entry to import the memory being exported by the receiving node. (step 104). The OMMU entry set up at step 104 maps a range the global address range specified in the received memory export message to a corresponding range of physical memory in the server node. If necessary (e.g., if a sufficiently large contiguous range of physical addresses assigned to the network interface is not available and/or the size of the mapped address range is not equal to $2^n$ pages), the server node will generate two or more OMMU entries so as to map the specified global address space to two or more local physical address ranges.

Once node A is ready to send a message to node B, the message sending procedure in node A marshals the data to be sent to node B (step 106), which basically means that the data is formatted and stored in a local send buffer in a predefined manner suitable for processing by an application procedure in node B. In an alternate embodiment, the data to be sent could be marshaled directly to the remote receive buffer, in which case the OpenBarrier procedure call of step 302 would need to be performed before the data marshaling step so as to detect transmission errors during the remote writing of the data portion of a long message.

After the data to be sent is marshaled in a local buffer, an OpenBarrier(BarrierValue) procedure call is made (step 302). The OpenBarriero procedure stores a network communications error event count (CEEcount) in a local variable (BarrierValue). When the corresponding CloseBarrier (BarrierValue) procedure is called at a later time, the current network communications error event count CEEcount is compared with the locally stored value BarrierValue. A return code of 0 is returned if the two are equal, and a nonzero return code (e.g., rc=1) is returned if the two are not equal.

The OpenBarrier and CloseBarrier procedures differ significantly from a remote read operation. The OpenBarrier procedure does not block continued operation of the executing thread whatsoever; and the CloseBarrier procedure blocks operation of the executing thread only until all pending remote write operations by the sending system's network interface (NIC card) have completed. The time duration of the blocking caused by the CloseBarrier procedure is very brief compared with the duration of the blocking caused by a remote read operation because the CloseBarrier procedure does not need to wait for the receiving system to perform any operations other than those performed by the receiving system's network interface (i.e., converting global addressed to local physical addresses and transmitting the data being written onto an internal bus of the receiving system using those local physical addresses).

The barrier instructions monitor error count values maintained by the packet level transport hardware and software that handle the mechanics of transmitting packets across a communication channel between computer nodes. The packet level transport hardware and software detect transmission errors, channel availability problems, and NIC card errors during packet transmission, and increments an error counter every time any type of error occurs that might indicate a packet was not successfully transmitted across the communication channel to its intended destination (e.g., a receive buffer). Because the barrier instructions do not change the underlying timing or mechanics of performing a pure "remote write" to a specified memory location in a remotely located computer, the barrier instructions impose a much smaller latency and resource usage burden than are imposed by a remote read operation.

After the OpenBarrier procedure is called, a remote write is performed to write the contents of the send buffer to the global addresses assigned to the receive buffer to which the data portion of a long message is being sent (step 304). Writing data to a global address causes the sending node's communication interface to transmit the data being written to the node associated with those global addresses, as indicated in the sending node's OMMU entry (or entries) for those global addresses. This data transmission operation (step 108) may be performed under direct CPU control by "programmed I/O" instructions, or it may be performed by a communications interface (NIC) DMA operation (i.e., in which case the DMA logic in the network interface handles the transfer of data from local physical memory to the communications network).

Once the remote write step 304 successfully completes, another remote write operation is performed (step 306) to store a short message in a "received message queue" in Node B. The short message typically contains a "cookie" or other data structure that indicates the location of the main message transmitted at step 108. Alternately, if the entire message being sent is very short (e.g., less than 60 bytes), steps 302 and 304 are skipped, and the entire message transmitted is stored in the receive queue by step 306.

After the short or control message is written into the received message queue of the receiving node, a CloseBarrier(BarrierValue) procedure is called (step 308). If a return code of 0 is returned (indicating that no communication system errors occurred while the barrier was open), a trigger message (also variously known as a Wakeup message or interrupt message) is sent to Node B's network interface (step 116), which triggers the execution of a procedure in Node B for processing received messages (e.g., by inspecting the received message queue to determine what new messages have been received, and so on). If the CloseBarrier call returns a non-zero return code value, indicating a communications error occurred while the barrier was open, the procedure returns to step 302 to repeat the transmission of the message. If after a predetermined number of iterations the data transmission continues to be unsuccessful, an error message is sent to the operators of the sending and receiving computers to indicate a message transmission failure (step 310).

At some point, usually immediately after sending the message, the message sending thread in node A unexports the receive buffer it has used by tearing down or modifying the OMMU entry for the previously imported memory (step 118).

Computer Node Configuration

Figure 8:
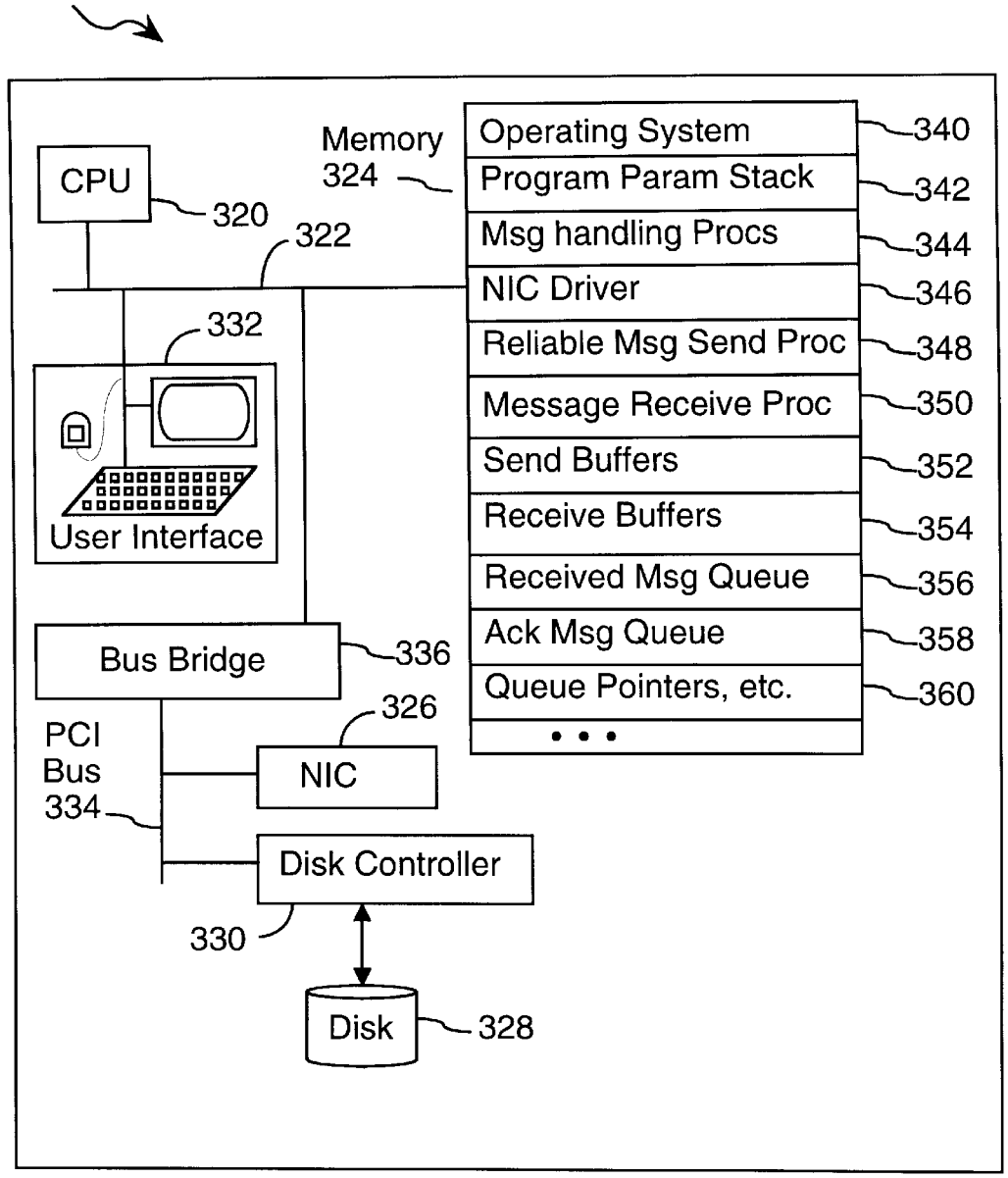
FIG. 8 is a block diagram of a computer incorporating a preferred embodiment of the present invention.

FIG. 8 shows a block diagram of a computer 210 within the server cluster 200 (see FIG. 6). The computer 210 can be either a sending or receiving node with respect to a particular remote messaging operation. The computer 210 includes a CPU 320, an internal communication or memory bus 322, random access memory 324, a communications or network interface (NIC) 326, and a non-volatile, non-random access memory device 328, such as a high speed magnetic disk, and a corresponding disk controller 330.

In a preferred embodiment, the NIC 326 and disk controller 330 are coupled to a PCI bus 334 that is, in turn, coupled to the main memory bus 322 by a bus bridge 336. The computer's memory 324 stores, usually in conjunction with the disk storage device 328:

an operating system 340 (e.g., Sun Microsystems' Solaris™ operating system);

a program parameter stack 342 for each thread, used to pass parameters during procedure calls and returns, as well as other purposes well known to those skilled in the art;

application programs 344, including application programs that can initiate the allocation of send and receive buffers, initiate the transmission of data to another node, request data from a remotely located disk storage device, and so on;

a NIC driver 346 for controlling the network interface 326 and for managing use of the IMMU and OMMU therein (not shown in FIG. 8);

a reliable message sending procedure 348 (which is preferably implemented as part of the operating system 340) for sending short and long messages to a remote node;

a message receive procedure 350 (which is preferably implemented as part of the operating system's kernel) for processing received messages (i.e., passing them to appropriate applications for processing), and managing the received message queue;

send buffers 352 for marshaling data and messages to be sent to another node;

receive buffers 354 for receiving data from other nodes;

a received message queue 356 for receiving "completed" messages and the like from other nodes after they have transmitted data to a receive buffer 354, and for receiving short messages from other nodes;

an ack message queue 358 for storing data indicating the status of messages transmitted to other nodes; and message and ack queue pointers and local variables 360 for managing use of the received message and ack message queues for both sending and receiving messages.

Received Message Queue and Ack Message Queue Data Structures

Figure 9:
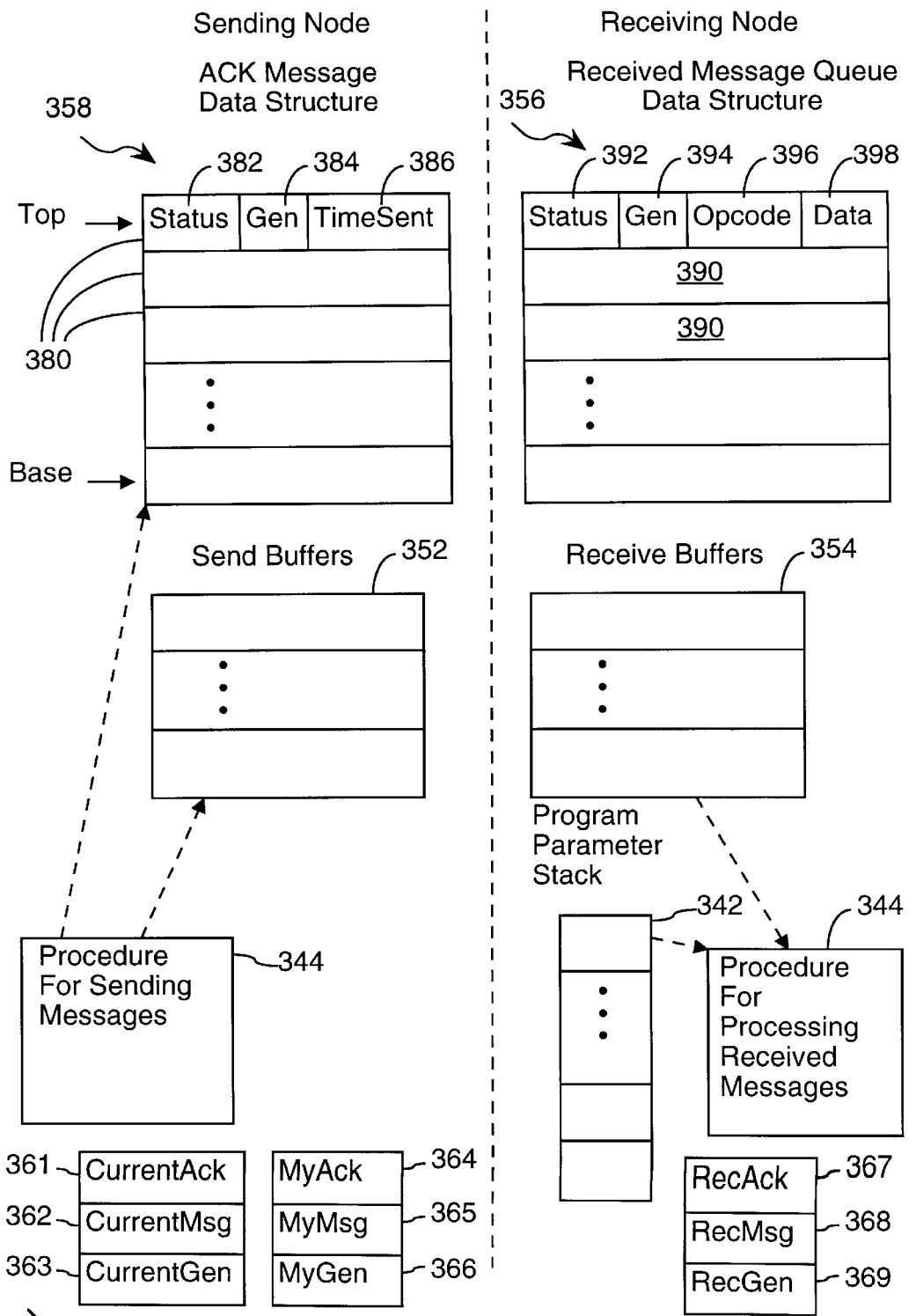
FIG. 9 depicts some of the primary data structures used in a preferred embodiment of the present invention.

Referring to FIG. 9, the Ack message queue consists of a set of N (e.g., 16 or 32) ack entries 380, each of which is used to keep track of the status of one message transmitted to another node. Each ack entry 380 includes the following information fields:

Status 382, which can have one of two values: Msg_Sent, which indicates that a message was sent, but has not yet been acknowledged by the receiving node, and Msg_Empty, which indicates that the corresponding message has been acknowledged and processed by the receiving node.

Gen 384, which is equal to 1 or 0. The purpose of the Gen field value is to determine whether or not a Status value in a respective received message queue entry corresponds to (A) the most recent message for this ack queue entry, or (B) the previous message for this ack queue entry. The Gen value to be stored in each of the ack message queue entries is toggled each time all the slots in the ack message queue have been used. Thus, a Gen=0 value will be used for the transmission of N messages, at which point the next ack queue entry is at the base again and the Gen value is changed to Gen=1 for the next N messages. The Gen field 384 is used to help determine whether or not the node to which a message has been sent actually received the Msg_Sent status value, which enables processing of the message by the receiving system. In particular, if the received message queue entry 390 corresponding to an ack queue entry has a different Gen value 394 from the ack message queue entry 380, that means the Msg_Sent status value for the message was not successfully received.

TimeSent 386, which represents the time at which the corresponding message was transmitted to a destination node. When a message's transmission is not acknowledged within a certain amount of time of its transmission, special measures are undertaken (as explained below) to resolve the problem.

The pointers and generation values maintained at each node are as follows:

The CurrentAck pointer 361 points to the ack queue entry currently being used.

The CurrentMsg pointer 362 points to the message queue entry 390 in the receiving node that corresponds to the current ack queue entry 380.

The CurrentGen value 363 is the gen value for the current ack queue entry.

The MyAck 364, MyMsg 365 and MyGen 366 values are local copies of the CurrentAck 361, CurrentMsg 362 and Current Gen 363 values used for keeping track of the pointer and generation values for the last message sent.

The RecAck 367, RecMsg 368 and RecGen 369 values are pointer and generation values used by the receive message procedure for processing received messages and sending acknowledgments to the node that sent each such message.

Each time a message is transmitted, (A) the sending node stores corresponding values in an ack queue entry 380, (B) the CurrentAck 361, CurrentMsg 362 and Current Gen 363 values are copied to MyAck 364, MyMsg 365 and MyGen 366, and (C) a bump() procedure is called that advances the CurrentAck 361 and CurrentMsg 362 pointers to the point to the next ack and received message queue entries. If the current ack entry is the top entry in the ack message queue, the bump() procedure resets the CurrentAck 361 and CurrentMsg 362 pointers to point to the base ack message queue entry and the base received message queue entry (in the receiving node), respectively, and updates the CurrentGen 453 to a next (different) value from its prior value.

The received message queue 356 consists of a set of N (e.g., 16 or 32) entries 390, each of which is used to store one message received from another node. Each receive message entry 390 includes the following information fields:

Status 392, which can have one of three values:
  Msg_Sent, which indicates that a message was received, but has not yet been processed or acknowledged by the receiving node,
  Msg_Rcvd, which indicates the message is being processed, but has not yet been acknowledged; and
  Msg_Empty, which indicates that the processing of the message has been initiated and an acknowledgment has been transmitted to the sending node.

Gen 394, which is equal to 1 or 0, and is the generation value written into the queue entry by the sending node.

Opcode 396, which indicates the type of message and the procedure needed to process it. For instance, some opcodes indicate the message is a protocol message, while other opcodes indicate that the message needs to be processed by an application program.

Data 398, represents either the body of a short message, or one or more "cookie" values used to denoting the location of the receive buffer(s) in which the message is located.

In a preferred embodiment the Status and Gen fields 392, 394 of each received message queue entry are stored in a single byte or word, and are preferably written together using a single write operation because the storage of both items must either succeed or fail together. That is, it would be completely unacceptable for the Status value to be successfully written into the message queue entry, but for the writing of the Gen value to fail, or vice versa.

From a broader perspective, the Gen field value is a single binary digit (i.e., single bit) sequence number. In an alternate embodiment, the Gen field value could be replaced by a multiple bit sequence number, where each Gen field sequence number would be incremented for an ack queue entry each time-a message for that entry is sent to the receiving system. The Gen field sequence number stored in the respective received message queue entry would indicate the last message for which it received Status and Gen field values from the sending system.

Since each node both sends and receives messages, each node has one complete set of the sending node data structures for each other node to which is sends messages, and also has one complete set of the receiving node data structures for each node from which it receives messages.

Preferred Embodiment of the Short Message Remote Write Procedure

For the purposes of this document, a "long message" is defined to consist of a data portion written to a buffer plus a short message, which typically contains one or more "cookies" that point to the location where the data portion of the long message is stored. However, for convenience, the data portion of a long message is sometimes referred to as the "long message."

Figure 10:
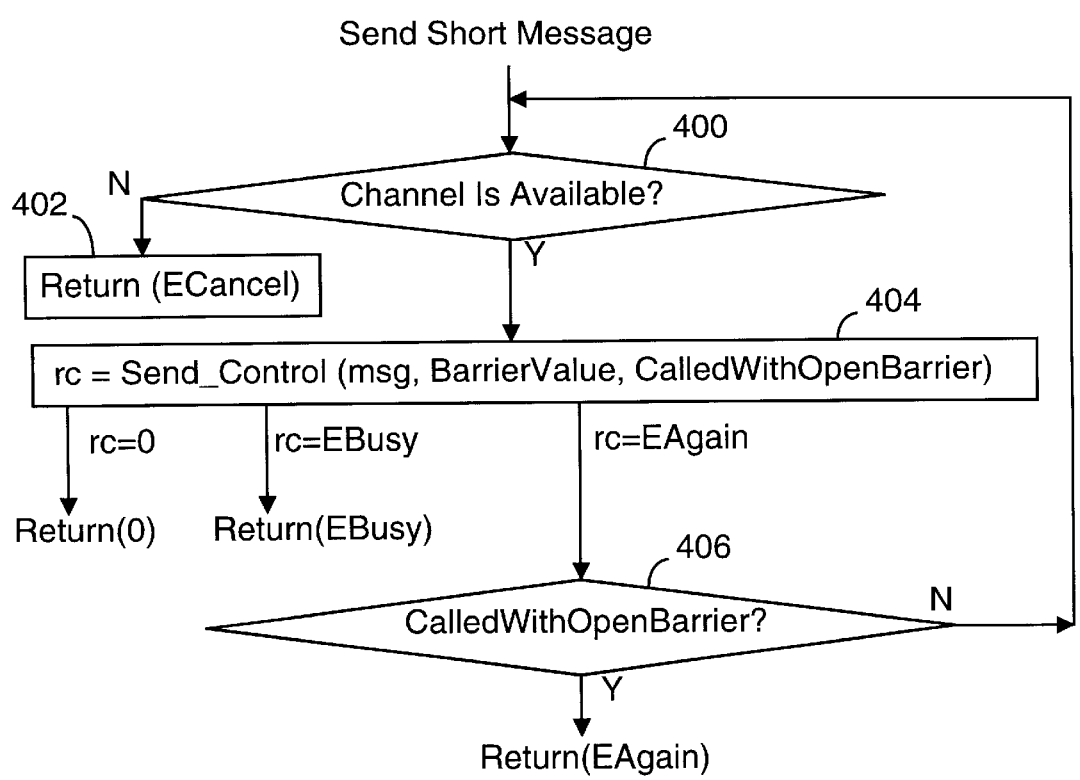
FIG. 10 is a flow chart of procedure for initiating the remote writing of a "short message" into the receive queue of a remotely located node in a preferred embodiment of the present invention.

Referring to FIG. 10, in the preferred embodiment, when sending either a short message (also called a "control message" or a "completed message") after sending the data portion of a long message, the Send Short Procedure is called by the sending node. This procedure, and the procedures called by it, make no assumptions as to whether or not the data portion of a long message has been sent prior to the transmission of the short message.

At step 400, the Send Short Message procedure determines if the communication channel required for transmitting a message to the other, destination node associated with the short message to be sent is available. If the communication channel is not available, the procedure exits with a return code of ECanceled (step 402), which signals the calling routine that the communication channel was not available. Typically, the calling routine will retry sending the short message a number of times, separated by a predefined time interval until an external monitoring process determines that the communication channel is not working properly.

If the channel is available, the Send_Control procedure is called (step 404), which is described below with respect to FIG. 11. The parameters in this procedure call are:

msg, which represents the message or data to be transmitted to the received message queue in the receiving computer node;

CalledWithOpenBarrier, which is a boolean parameter that is equal to True if an OpenBarrier(BarrierValue) procedure call has been made by the calling procedure (i.e., the procedure calling the Send Short Message procedure). Basically, if a long message is being sent, CalledWithOpenBarrier will be True, and otherwise it will be False.

BarrierValue, is the value previously returned by the OpenBarriero procedure call, if it was in fact called by an calling procedure.

The call to the Send_Control procedure (step 404) will return one of three return codes (rc):

rc=0, meaning that the short message was written to the remote node without incurring any communications system errors. This means the short message was actually stored in the remote node's received message queue.

rc=EBusy, indicating that received message queue in the remote node is full and not yet ready to receive any new messages.

rc=EAgain, indicating a communication system error (also called a barrier failure) was detected during transmission of the short message.

If Send_Control returns a return code (rc) of 0, the Send Short Message procedure simply exits with a return code of 0, which tells the calling procedure that the short message was written to the remote node. If the Send_Control returns a return code (rc) of EBusy, the Send Short Message procedure exits with a return code of EBusy, which tells the calling procedure that the remote receiving node's received message queue is full and thus not ready to receive new messages.

Finally, if Send_Control returns a return code (rc) of EAgain, and the calling procedure did not previously call OpenBarrier() (step 406-N), the Send Short Message procedure once again tries to send the short message by restarting at step 400. If the calling procedure did previously call OpenBarrier() (step 406-Y), that means the barrier failure might indicate a failure during transmission of data portion of the long message. As a result, the Send Short Message exits with a return code of EAgain, which tells the calling procedure that it should restart the entire message transmission procedure, including resending the data portion of the long message if a long message is being sent.

Figure 11A:
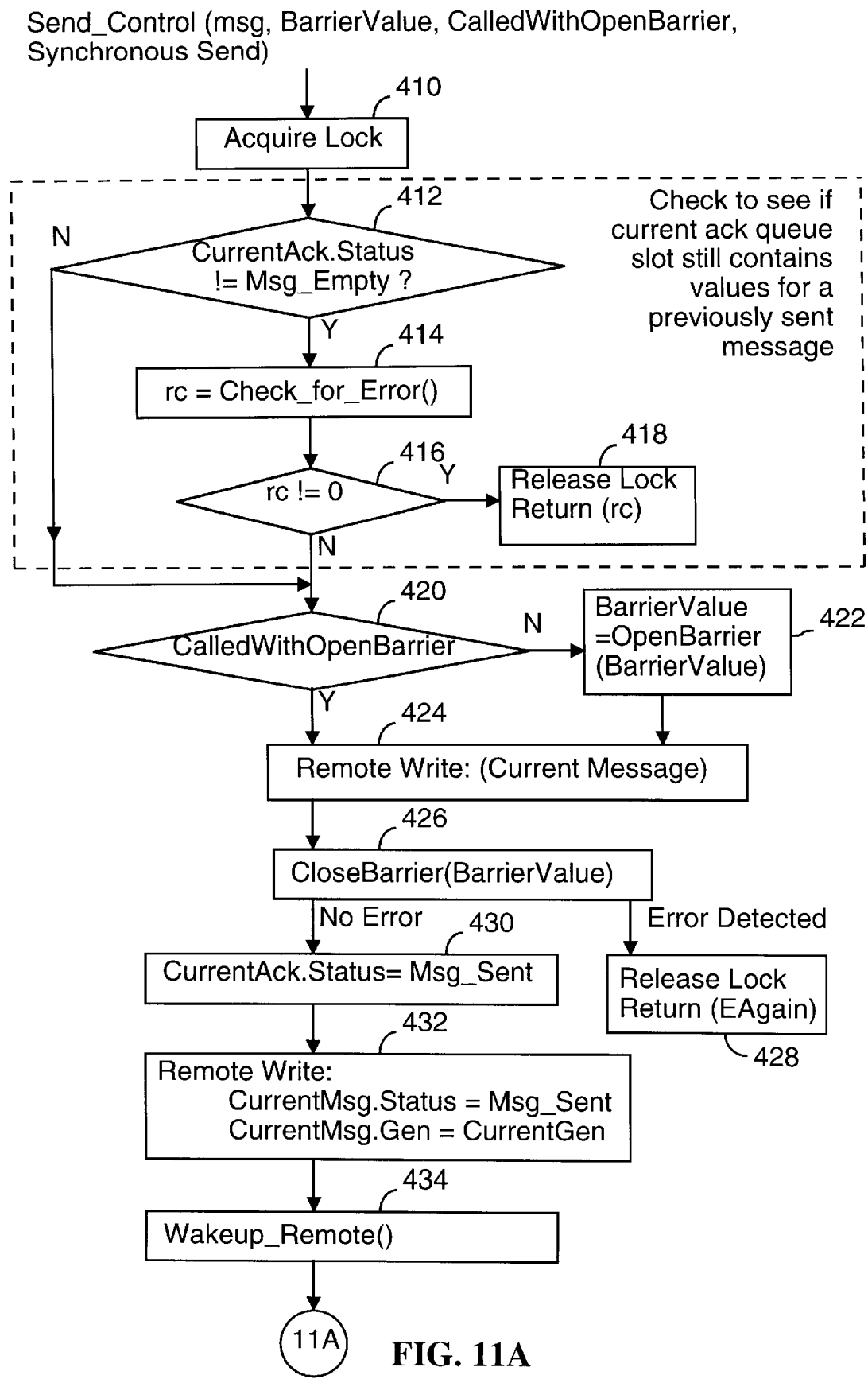
FIGS. 11A and 11B is a flow chart of a low level operating system procedure for handling the mechanics of remotely writing a "short message" into the receive queue of a remotely located node in a preferred embodiment of the present invention.
Figure 11B:
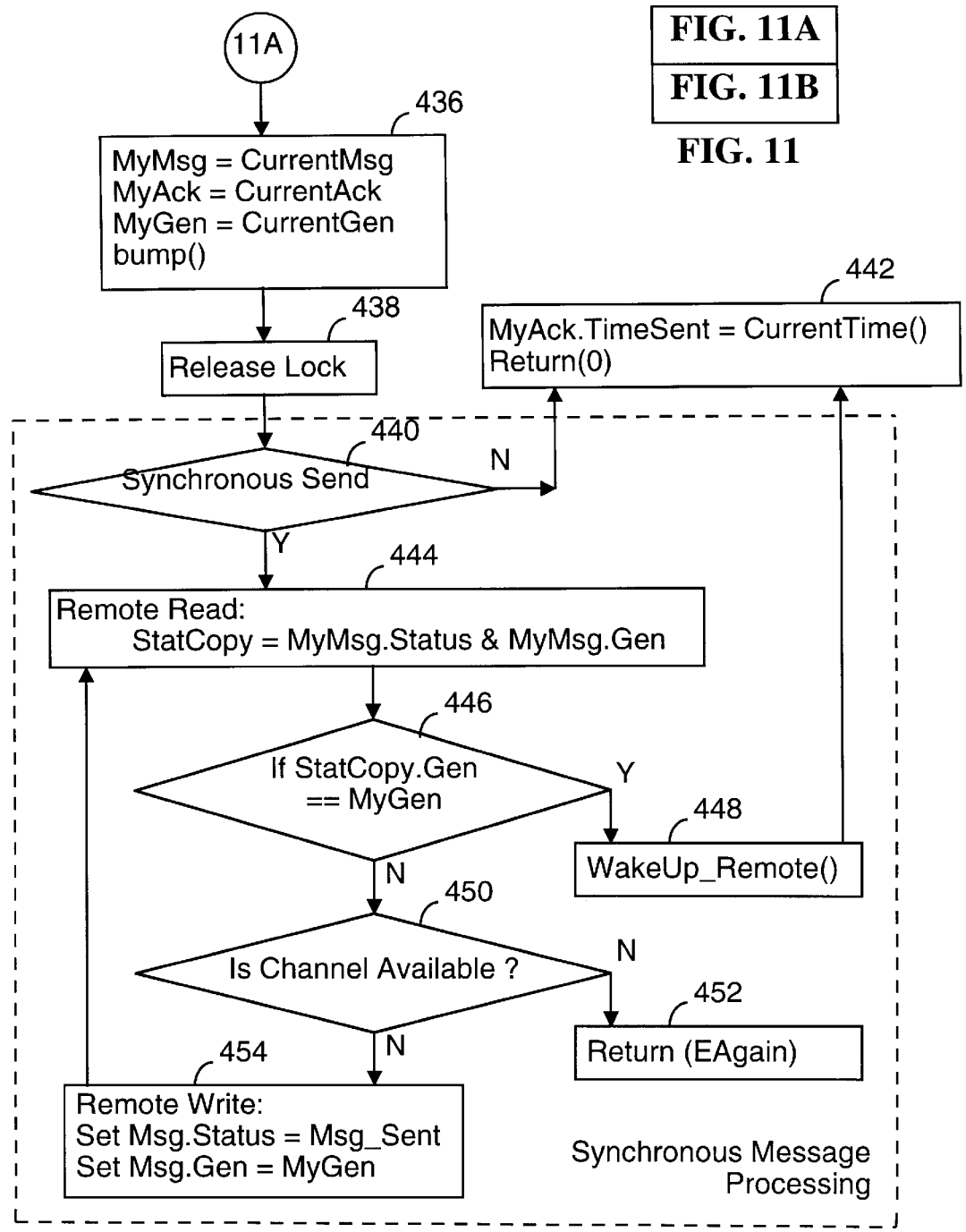

Referring to FIG. 11 (which includes FIGS. 11A and 11B), the Send_Control procedure works as follows. There is a single message transmission "lock" for each ack message queue, which is shared by all the procedures using the ack message queue and which protects the ack message queue from two procedures acting on the ack message queue simultaneously. The lock is generally an operating system primitive, the specific implementation of which depends on the operating system being used by the computer in which the present invention is implemented.

In the flow charts of FIG. 11–14, and in the following text, the symbol "!=" means "not equal." Thus the conditional statement:

If CurrentAck.Status!=Msg_Empty
{do X} indicates that if CurrentAck.Status is not equal to Msg_Empty, operation X is performed.

The Send_Control procedure begins by acquiring the lock for the ack message queue (step 410), which means that the procedure waits at step 410 as long as necessary until it acquires the lock. Steps 412–418 check to see if the current ack queue entry pointed to by the CurrentAck pointer (see FIG. 9) still contains valid values for a previously sent message. In particular, if the CurrentAck.Status is equal to Msg_Empty (412-N), the status information in the current ack queue entry (for a previously sent message) is no longer needed and processing continues at step 420.

Otherwise (412-Y), the sending system has not yet received an acknowledgment from the receiving system for the previously sent message whose status information is still stored in the current ack queue entry. As a result, the Check_for_Error procedure is called (414), which will be described later with respect to FIG. 13. If the Check_for_Error procedure returns a nonzero return code (41 6-Y), the lock is released and the Send_Control procedure exits and passes the Check_for_Error procedure's return code as its own return code, which is thus passed to the calling procedure (i.e., to the Send Short Message procedure). If the Check_for_Error procedure returns a zero return code (416-N), that means that it has been determined that the previously sent message has now been received and acknowledged by the receiving system, and thus processing of the current message can continue at step 420.

If the Send_Control procedure was not called with an OpenBarrier procedure call having already been made by a calling procedure (step 420), an OpenBarrier(BarrierValue) procedure call is made now so as to "protect" the transmission of the short message (step 422). Next, a remote write is performed so as to send the current short message to the receiving system's received message queue (step 424). If successful, the short message will be stored in the CurrentMsg entry of the received message queue. Then a CloseBarrier(BarrierValue) procedure call is made (step 426) to determine if any communication system errors occurred during transmission of the short message. If a communication system error is detected, the lock is released and the Send_Control procedure exits with a return code of EAgain (step 428), indicating that the message transmission failed.

If a communication system error is not detected, the status value in the current ack entry is set to Msg_Sent (step 430), to record the fact that the message was sent. Then a remote write operation is performed to write a value of "Msg_Sent" into the Status field of the current entry in the received message queue of the receiving system, and to also write the current generation value (CurrentGen) into the generation field of that received message queue entry (step 432).

In a preferred embodiment, the Status and Gen fields of each received message queue entry are stored in a single byte or word, and are written using a single write operation. In alternate embodiments in which the atomic unit for remote writes is large, such as 64 bytes, the entire control message, including the Status and Gen field values are all written as single remote write operation (e.g., at step 424, inside the barrier).

The Msg_Sent value, when stored in the received message queue entry, tells the receiving system that there is a message ready for processing by the receiving system. However, if the receiving has already finished processing all previously sent messages, it may not have any threads actively looking at the received message queue for new messages. Thus, after the Msg_Sent value is written to the received message queue entry, the Wakeup_Remote procedure is called (step 434), which sends a trigger (interrupt) message to the receiving system, which in turn prompts the receiving system to execute its procedure for processing messages in the received message queue.

After the short message has been sent and a Wakeup call also sent to the receiving node without any known error, the Send_Control procedure makes a local copy of the CurrentMsg, CurrentAck and CurrentGen pointer and generation values in the MyMsg, MyAck and MyGen local variables. In addition, the bump() procedure is called so as to advance the CurrentMsg and CurrentAck pointers (step 436). As a result, the MyMsg, MyAck and MyGen local variables retain information about the last sent message.

At step 438 the lock is released, enabling other threads of execution in the sending computer (node) to initiate the transmission of additional messages.

A further optimization, not shown in the FIG. 11, is that the Wakeup_Remote procedure call in step 434 is preferably performed only if (A) the last sent message is represented by the base entry in the ack message queue, or (B) the message sent before the last message has already been acknowledged by the receiving node, indicating that the receiving node's procedure for processing received messages may have exited or gone to sleep due to a lack of any messages to process. This optimization may, on rare occasions, cause a Wakeup message not to be sent when it should have been sent. However, the consequence of this are relatively minor since the receive node's procedure for processing received messages is periodically restarted by a timeout thread executing on the receiving node.

Synchronous messages are defined for the purposes of this document to be messages whose ordering with respect to other messages being sent by the same thread of execution in the sending computer cannot be changed, and further are messages where it must be known that the message has been received and processing has begun by the receiving node, enabling the sending node to rely on the successful transmission of the message before allowing the sending thread to perform any subsequent tasks. If the message being sent is not a synchronous message (step 440-N), the current time value, generated by the CurrentTime() procedure, is stored (step 442) in the TimeSent field of the ack entry for the last sent message (i.e., in MyAck.TimeSent, or in C language syntax, in MyAck→TimeSent).

If the message being sent is a synchronous message (step 440-Y), a remote read is performed to read the Status and Gen fields of the received message queue entry corresponding to the last sent message (step 444). As explained above, remote reads are relatively expensive in terms of system latency and resource usage, and thus are not used in the present invention except where necessary.

If the Gen field of the received message queue entry is equal to the expected generation value (which is stored in the variable MyGen) (446-Y), it is concluded that the receiving node did receive the transmitted control message, and the Wakeup_Remote() procedure is called once again (step 448) to send another received message queue interrupt to the receiving node. This Wakeup message is sent to help make sure the receiving node processes the just sent message in a timely fashion. After sending the Wakeup message, the current time value, generated by the CurrentTime() procedure, is stored (step 442) in the TimeSent field of the ack entry for the last sent message.

If the Gen field of the received message queue entry is not equal to the expected generation value (446-N), it is concluded that the receiving node did not receive the Status and Gen values transmitted at step 432. When this happens, the procedure checks to see if the communication channel is available (step 450) (i.e., to make sure there hasn't been communication channel failure). If the channel has failed, a Send_Control procedure exits with an error return code of EAgain (step 452), which tells the calling routine that a transmission error has occurred. If the communication channel is available (450-Y), the Status and Gen values are retransmitted (step 454) and then step 444 is repeated.

Receiving Node Procedure for Processing Incoming Messages

Figure 12:
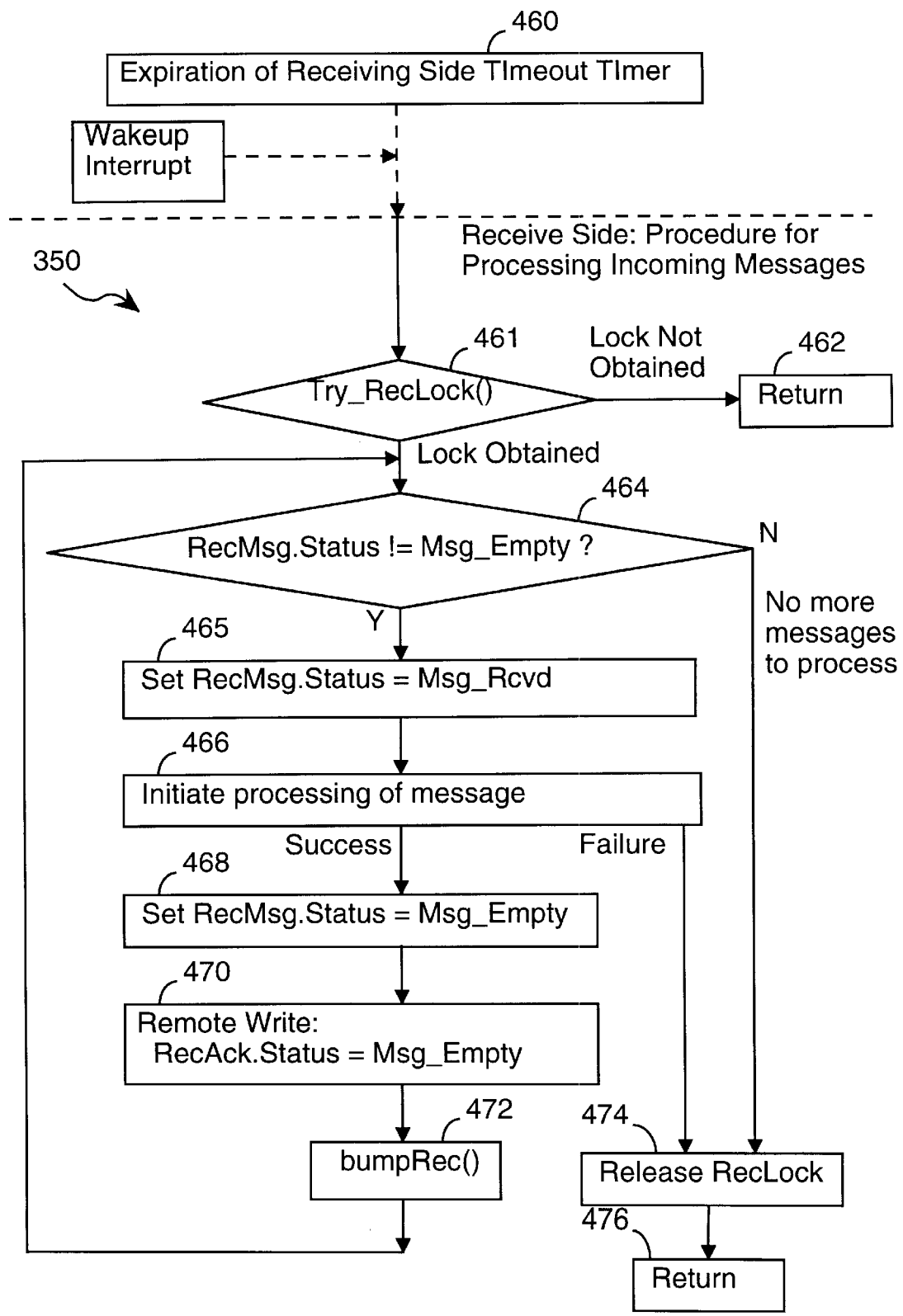
FIG. 12 is a flow chart of a "receive message" procedure for processing received messages in a preferred embodiment of the present invention.

Referring to FIG. 12, the receiving node procedure for processing incoming (i.e., received) messages is restarted periodically by a timeout thread (step 460). This procedure is also restarted whenever a Wakeup interrupt message is received from the sending node.

Upon restarting, the procedure tries to obtain a lock (herein called the RecLock) that corresponds to the received message queue (step 461). If the lock is currently held by another thread, the procedure simply exits (step 462). If the lock is obtained the Status field of the current entry in the received message queue is checked to see if it has a value other than Msg_Empty (step 464). If the Status of the current received message queue entry is equal to Msg_Empty, that indicates there are no new messages in the queue that require processing, and therefore the procedure releases the lock (step 474) and exits (step 476).

If the Status of the current received message queue entry (pointed to by the RecMsg pointer) is not equal to Msg__Empty, that indicates there is at least one new message in the queue that requires processing, and the Status of the current received message queue entry is set equal to Msg__Rcvd (step 465), to indicate that the receiving node has detected receipt of the message.

Then processing of the message corresponding to the current message queue entry is initiated (step 466). In a preferred embodiment, processing of the message is initiated by copying it onto the stack and calling a procedure corresponding to the Opcode value in the message queue entry. However, the particular mechanism by which such processing is initiated depends on aspects of the receiving system not important to the present invention.

If processing of the current message cannot be initiated for any reason (e.g., the required resources may not be available), the procedure releases the received message queue lock (RecLock) (step 474) and exits (step 476).

Otherwise, if the processing of the current message was successfully initiated, the Status field of the current received message queue entry is set to Msg__Empty (step 468), to indicate that processing of the message has been initiated. Further, a remote write is performed by the receiving system to set the Status field in the corresponding ack queue entry to Msg__Empty (step 470), thereby acknowledging receipt of the message. In addition, the bumpRec() procedure is called so as to advance the RecMsg and RecAck pointers (step 472), so as to point to the queue entries for next message, if any, in the received message queue. Then the procedure starts processing the next received message, if any, at step 464.

Check for Error Procedure

A feature of the present invention is that it can positively determine whether a message transmission failure was caused by a failure while transmitting the message data to the receiving system, or while the receiving system was transmitting an acknowledgment message back to the sending system. The two procedures which perform this function in the preferred embodiment are the Check for Error and Check for Timeout procedures.

Accurately making such determinations is important because it is important not to send the receiving system the same message twice. Sending the same message twice could the receiving system to perform an operation twice that should only be performed once. Each message must be reliably received and processed by the receiving system exactly once to ensure proper system operation.

The basic scheme for determine where a message transmission failure occurred is outlined in Table 1 and is described next. When the sending system fails to receive an acknowledgment message, as indicated by the ack queue entry for the message continuing to store a Status field value of Msg__Sent, the sending system reads the Status and Gen fields of the corresponding received message queue entry in the receiving system. If the Status field in the received message queue entry is equal to either Msg__Sent or Msg__Rcvd, that means receiving system received the message, but has not yet processed it. Thus, in those two case there has been not been a communications failure, but the receiving system may be experiencing problems.

If the Status field in the received message queue entry is equal to Msg__Empty and the Gen field matches the expected Gen value, that means receiving system received and processed the message, and has sent an acknowledgment message, but the acknowledgment message did not reach the sending system for some reason. In this case, the sending system simply changes the Status field value for the ack queue entry to Msg__Empty, indicating the successful transmission and processing of the last message sent using that ack queue entry.

Finally, if the Status field in the received message queue entry is equal to Msg__Empty and the Gen field matches the expected Gen value, that means that the remote write operation for writing the Status and Gen values into the received message queue failed, and therefore the message was not processed by the receiving system. This is remedied by attempting once again to perform the remote write operation for writing the Status and Gen values into the received message queue.

By accurately determining the message processing failure, if any, the proper remedial action is determined and undertaken.

TABLE 1

Determining Source of Messaging Error

| Status & Gen Values in Received Message Queue Entry | Description & Remedial Action (if any) |
|---|---|
| Status = Msg__Sent | No transmission error. Receiving system has not yet processed message. |
| Status = Msg__Rcvd | No transmission error. Receiving system has not yet finished processing message. |
| Status = Msg__Empty & Gen = expected value | Transmission error sending acknowledgment message. Fix by setting Status in ack queue message entry to Msg__Empty. |
| Status = Msg__Empty & Gen != expected value | Transmission error sending Status and Gen values to receiving system. Attempt to fix by resending Status and Gen values to receiving system. |

Figure 13:
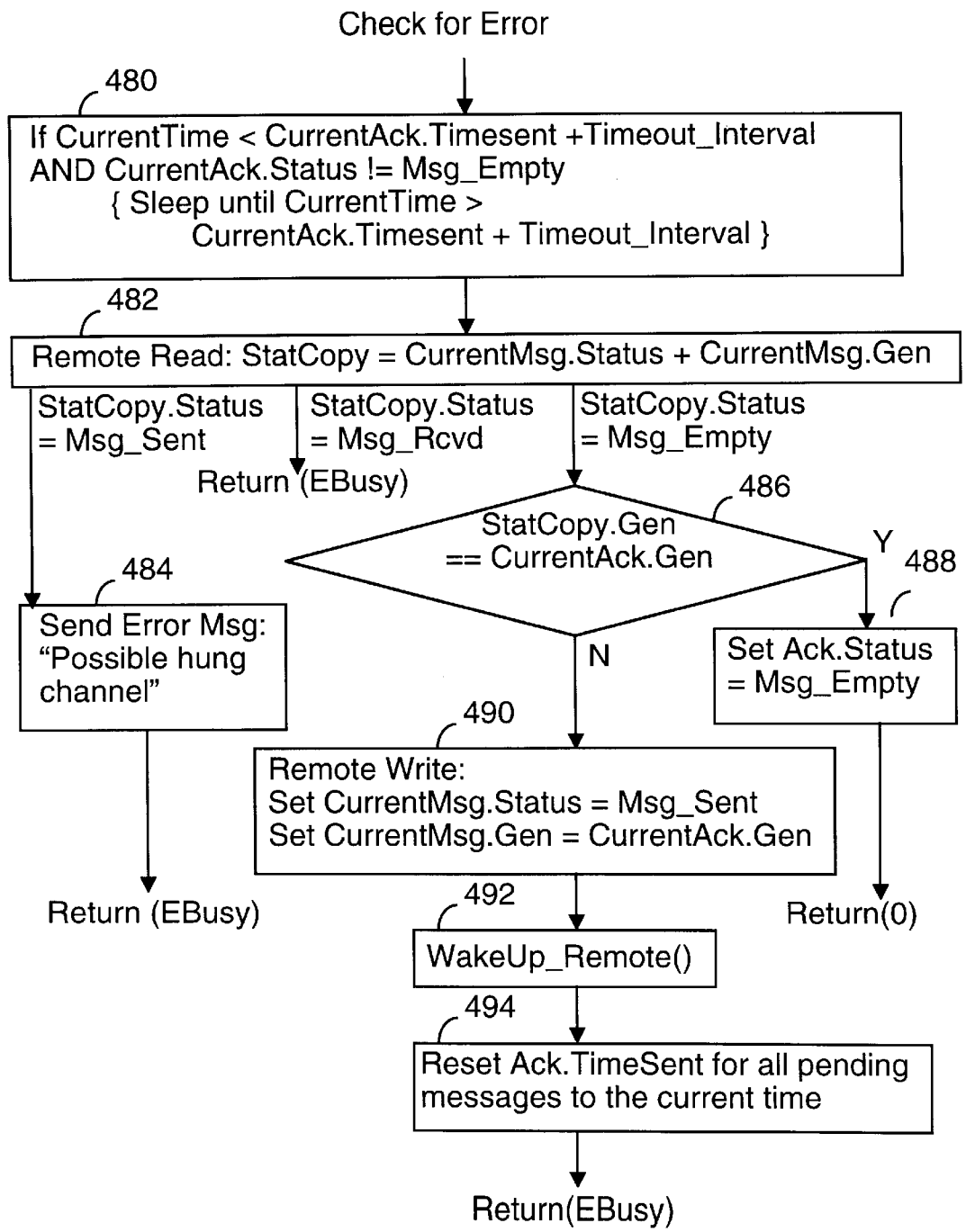
FIG. 13 is a flow chart of a procedure for detecting and correcting message transmission errors in a preferred embodiment of the present invention.

Referring to FIG. 13, the Check for Error procedure is called by the Send__Control procedure at step 414 (see FIG. 11) when the sending system has not yet received an acknowledgment from the receiving system for the previously sent message whose status information is still stored in the current ack queue entry. The Check for Error procedure first checks to see if the amount of time elapsed since the transmission of the previously sent message is at least a predefined Timeout__Interval and that the message status in the ack queue entry is still not equal to Msg__Empty (step 480). If the Timeout__Interval has not yet elapsed, then the sending system has sent a sequence of messages so quickly that it used all the slots in the ack message queue before the Timeout__Interval has elapsed. If both the tested conditions are true, the sending thread is put in a sleep condition until expiration of the Timeout__Interval.

Next, a remote read is performed to read the Status and Gen fields of the received message queue entry corresponding to the current ack queue entry (step 482). If the Status field value is equal to Msg__Sent, this means that the receiving system received the message but did not process it. This indicates a failure or delay in the receiving system, and thus an error message is generated (step 484) and the procedure exits with an return code of EBusy, indicating that the calling procedure should retry sending the current message after waiting a predefined amount of time.

If the Status field is equal to Msg__Rcvd, this means that the receiving system has started processing the previously sent message, but has not finished processing it. In this case the Check for Error procedure exits with an return code of EBusy, indicating that the calling procedure should try to resend the current message after waiting a predefined amount of time.

If the Status field is equal to Msg_Empty, the procedure determines if the Gen field of the received message queue entry has the expected Gen value (step 486), which is the generation value stored in the corresponding ack message queue entry. If it does (486-Y), this means that the receiving system processed the message, but the acknowledgment message somehow failed to be stored in the ack message queue entry, and thus the Status field of the current ack message queue entry is set to Msg_Empty (step 488) and the procedure returns with a zero (no-error) return code value.

If the Gen field of the received message queue entry does not have the expected Gen value (486-N), this means the Status and Gen values were not stored in the received message queue entry. To remedy this problem a remote write is performed to resend the Status and Gen values the received message queue (step 490), and then the Wakeup_Remote procedure is called to send a trigger message to the receiving system (step 492). Furthermore, since the processing of all messages sent subsequent to the message corresponding to the current ack queue entry were not processed by the receiving system due to the failure to store the proper Status field value in the received message queue, the Time-Sent value in the ack queue for all the pending messages is reset to the current time (step 494) so as to give the receiving system sufficient time to process those messages. Then the Check for Error procedure exits with a return code of EBusy, indicating that the calling procedure should try to resend the current message after waiting a predefined amount of time.

Check for Timeout Procedure

Figure 14:
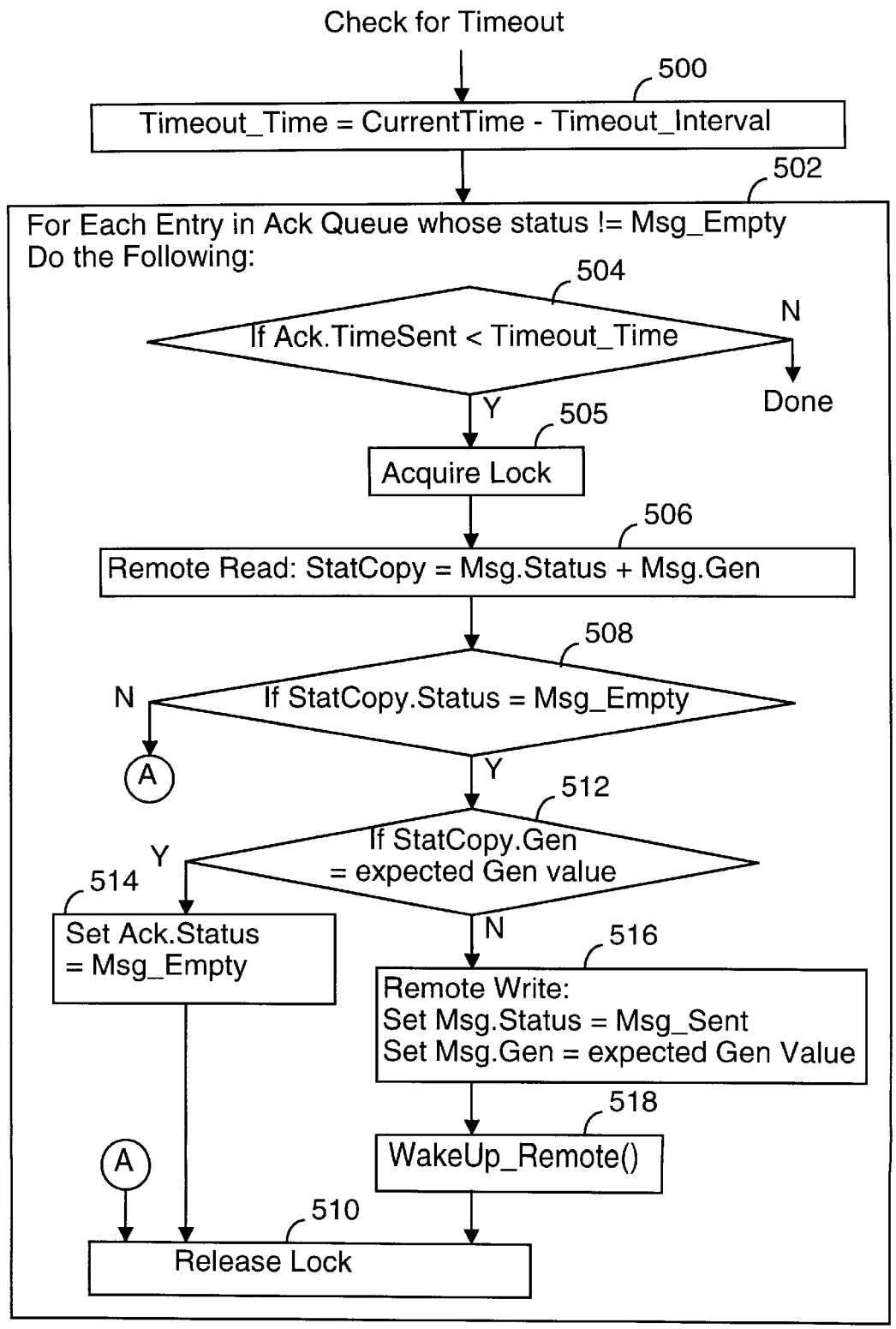
FIG. 14 is a flow chart of an operating system procedure for detecting and correcting message transmission timeout conditions in a preferred embodiment of the present invention.

Referring to FIG. 14, the Check for Timeout procedure is periodically called by a sending side timeout thread. The procedure first determines a Timeout Time, which is the current time minus a predefined timeout interval (step 502). Then, for each entry in the ack queue whose status is not Msg_Empty, each of which corresponds to an unacknowledged previously sent message, a set of remedial actions are performed (collectively references as step 502), which are as follows. If the TimeSent of the previously sent message is not earlier than the Timeout Time (step 504), no further processing of that message is needed because it has not yet timed out. If the TimeSent of the previously sent message is earlier than the Timeout Time (step 504-Y), the Check for Timeout procedure acquires the lock (step 505) and performs a remote read to read the Status and Gen fields of the received message queue entry corresponding to the ack queue entry being processed (step 506). If the Status field value is not equal to Msg_Empty (508-N), this means that the receiving system has not finished processing the message, and thus no further action is required by the Check for Timeout procedure, which then releases the lock (step 510).

If the Status field value is equal to Msg_Empty (508-Y), the Gen field value is compared with the expected Gen value (step 512). If the Gen field value is the expected value (512-Y), this means the receiving system has completed processing the previously sent message, and therefore the Status field in the corresponding ack queue entry is set to Msg_Empty (step 514) and the lock is released (step 510). If the Gen field value is not the expected value (512-N), this means the receiving system did not receive the Status and Gen values transmitted to the received message queue, and therefore a remote write is performed to write those values into the received message queue (step 516) and then a trigger message is transmitted to the receiving system (step 518) to prompt it to process outstanding received messages. The lock is then released (step 510).

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for sending messages from a first computer to a second computer, comprising the steps of:

transmitting messages from the first computer to the second computer using remote write operations to directly store each message in a corresponding memory location in the second computer, without performing remote read operations to confirm storage of each message in memory of the second computer;

sending trigger messages from the first computer to the second computer to prompt the second computer to process messages stored in memory of the second computer;

at the second computer, processing each received message and storing an acknowledgment message in a corresponding memory location in the first computer; and at the first computer, upon detecting a failure to receive the acknowledgment message corresponding to any of the previously sent messages, performing remedial actions to determine whether the second computer has processed the unacknowledged previously sent messages and to prompt the second computer to process any previously sent messages not yet processed;

the step of transmitting messages including remotely writing, for each transmitted message, a message status value and sequence number to a corresponding received message queue entry in the second computer;

the step of processing each received message including updating the message status value in the corresponding received message queue entry to indicate that the received message has been processed; and the step of performing remedial actions including remotely reading a portion of the received message queue entry in the second computer corresponding to a previously sent message for which an acknowledgment message has not been received, the remotely read portion containing the message status value and sequence number, and determining from the remotely read message status value and sequence number what additional remedial actions to perform.

2. The method of claim 1, detecting message transmission errors, if any, during the transmission of each message to the second computer and when a message transmission error is detected, resending the message to the second computer.

3. The method of claim 1, the step of performing remedial actions further including, when the remotely read message status value and sequence number indicate that the second computer system received and processed the corresponding previously sent message, storing the acknowledgment message in the corresponding memory location in the first computer.

4. The method of claim 3,
the step of performing remedial actions further including, when the remotely read message status value and sequence number indicate that the message status value and sequence number were not successfully written into the corresponding received message queue entry in the second computer, repeating the step of writing the message status value and sequence number to the corresponding received message queue entry in the second computer.

5. A method of writing a message from a first computer to a second computer, comprising the steps of:
at the second computer:
  allocating a set of receive buffers for receiving messages from the first computer;
  establishing a circular received message queue of entries for indicating receipt of respective messages at the second computer;
at the first computer:
  establishing a circular ack message queue of entries for denoting messages sent to the second computer, and establishing a pointer to a current entry in the queue and a pointer to a corresponding current entry in the received message queue in the second computer;
  remotely writing a sequence of messages into respective ones of the receive buffers in the second computer, without performing remote read operations to confirm storage of each message in the receive buffers in the second computer;
  for each message written into a respective receive buffer:
    remotely writing into a respective entry in the received message queue in the second computer a message status value indicating transmission of the respective message and a sequence number, without performing remote read operations to confirm storage of the message status value and sequence number in the respective entry in the received message queue; and
    storing in a respective entry in the ack message queue a message status value indicating transmission of the respective message;
    detecting transmission errors, if any, during the remote writing of each message and message status value, and when a transmission error is detected, repeating the respective remote writing steps;
at the second computer, responding to receipt of each respective message by:
  processing each received message, including:
    storing an acknowledgment message in a corresponding ack message queue entry in the first computer; and
    modifying the message status value stored in the respective received message queue entry to indicate that the message has been received and processed; and
at the first computer, upon detecting a failure to receive the acknowledgment message corresponding to any previously sent message, performing remedial actions to determine whether the second computer has processed the unacknowledged previously sent message and, when the remedial actions determine that the second computer has not processed the unacknowledged previously sent message, prompting the second computer to process the unacknowledged previously sent message.

6. The method of claim 5, wherein, when the remedial actions determine that the second computer has already processed the unacknowledged previously sent message, the remedial actions include storing the acknowledgment message in the corresponding ack message queue entry in the first computer.

7. The method of claim 5,
the step of performing remedial actions including remotely reading a portion of the received message queue entry in the second computer corresponding to a previously sent message for which an acknowledgment message has not been received, the remotely read portion containing a message status value and sequence number, and determining from the remotely read message status value and sequence number what additional remedial actions to perform.

8. The method of claim 7,
the step of performing remedial actions further including, when the remotely read status value and sequence number indicate that the second computer system received and processed the corresponding previously sent message, storing the acknowledgment message in the corresponding memory location in the first computer.

9. The method of claim 8,
the step of performing remedial actions further including, when the remotely read status value and sequence number indicate that the message status value and sequence number were not successfully written into the corresponding received message queue entry in the second computer, repeating the step of writing the message status value and sequence number to the corresponding received message queue entry in the second computer.

10. In a distributed computer system, apparatus for remotely writing messages from a first computer to a second computer comprising:
at the first computer:
  a CPU;
  a network interface for transmitting and receiving messages;
  a message transmission procedure for execution by the first computer's CPU, for transmitting messages from the first computer to the second computer, via the network interface, using remote write operations to directly store each message in a corresponding memory location in the second computer, without performing remote read operations to confirm storage of each message in the second computer's memory;
  the message transmission procedure including instructions for detecting message transmission errors, if any, during the transmission of each message to the second computer;
  the message transmission procedure including instructions for resending the message to the second computer when a message transmission error is detected;
  the message transmission procedure including instructions for sending trigger messages from the first compute to the second computer to prompt the second computer to process messages stored in the second computer's memory;
at the second computer:
  a CPU;
  a network interface for transmitting and receiving messages;

a set of receive buffers for receiving messages from the first computer;

a circular received message queue of entries for indicating receipt of respective messages at the [first] second computer;

a receive message procedure, for execution by the second computer's CPU, for processing each message received from the first computer and for remotely writing, via the network interface, an acknowledgment message in a corresponding memory location in the first computer;

at the first computer, an ack message queue of entries for denoting messages sent to the second computer, and a pointer to a current entry in the queue and a pointer to a corresponding current entry in the received message queue in the second computer;

the message transmission procedure including instructions for detecting a failure to receive the acknowledgment message corresponding to any of the previously sent messages, and for each unacknowledged previously sent message, performing remedial actions to determine whether the second computer has processed the unacknowledged Previously sent message and for prompting the second computer to process any unacknowledged previously sent messages that have not yet been processed;

the instructions for performing remedial actions including instructions for storing the acknowledgment message in a corresponding ack message queue entry in the first computer when the remedial actions determine that the second computer has already processed the unacknowledged previously sent message.

11. In a distributed computer system, apparatus for remotely writing messages from a first computer to a second computer, comprising:

at the first computer:

a CPU;

a network interface for transmitting and receiving messages;

a message transmission procedure, for execution by the first computer's CPU, for transmitting messages from the first computer to the second computer, via the network interface, using remote write operations to directly store each message in a corresponding memory location in the second computer, without performing remote read operations to confirm storage of each message in the second computer's memory;

the message transmission procedure including instructions for detecting message transmission errors, if any, during the transmission of each message to the second computer;

the message transmission procedure including instructions for resending the message to the second computer when a message transmission error is detected;

the message transmission procedure including instructions for sending trigger messages from the first compute to the second computer to prompt the second computer to process messages stored in the second computer's memory;

at the second computer:

a CPU;

a network interface for transmitting and receiving messages;

a set of receive buffers for receiving messages from the first computer;

a circular received message queue of entries for indicating receipt of respective messages at the [first] second computer;

a receive message procedure, for execution by the second computer's CPU, for processing each message received from the first computer and for remotely writing, via the network interface, an acknowledgment message in a corresponding memory location in the first computer;

at the first computer, an ack message queue of entries for denoting messages sent to the second computer, and a pointer to a current entry in the queue and a pointer to a corresponding current entry in the received message queue in the second computer;

the message transmission procedure including instructions for remotely writing into a respective entry in the received message queue in the second computer a message status value indicating transmission of the respective message and a sequence number; and instructions for detecting a failure to receive the acknowledgment message corresponding to any of the previously sent messages, and for each unacknowledged previously sent message, performing remedial actions to determine whether the second computer has processed the unacknowledged previously sent message and for prompting the second computer to process any unacknowledged previously sent messages that have not yet been processed;

the receive message procedure including instructions for updating the message status value in the received message queue entry corresponding to a received message to indicate that the received message has been processed; and the instructions for performing remedial actions including instructions for remotely reading a portion of the received message queue entry in the second computer corresponding to a previously sent message for which an acknowledgment message has not been received, the remotely read portion containing a message status value and sequence number, and determining from the remotely read message status value and sequence number what additional remedial actions to perform.

12. The apparatus of claim 11, the instructions for performing remedial actions further including instructions for storing the acknowledgment message in the corresponding memory location in the first computer when the remotely read status value and sequence number indicate that the second computer system received and processed the corresponding previously sent message.

13. The apparatus of claim 12, the instructions for performing remedial actions further including instructions for repeating the writing of the message status value and sequence number to the corresponding received message queue entry in the second computer when the remotely read status value and sequence number indicate that the message status value and sequence number were not successfully written. into the corresponding received message queue entry in the second computer.

* * * * *